(12) United States Patent
Rioux et al.

(10) Patent No.: US 6,564,663 B2
(45) Date of Patent: May 20, 2003

(54) TRANSMISSION SYSTEM FOR A STRADDLE TYPE VEHICLE

(75) Inventors: Roger Rioux, Magog (CA); Johann Holzleitner, Günskirchen (AT); Luc Bouchard, Austin (CA)

(73) Assignee: Bombardier Inc., Valcourt (CA)

( * ) Notice: Subject to any disclaimer, the term of this patent is extended or adjusted under 35 U.S.C. 154(b) by 0 days.

(21) Appl. No.: 09/942,956

(22) Filed: Aug. 31, 2001

(65) Prior Publication Data

US 2002/0148309 A1 Oct. 17, 2002

Related U.S. Application Data

(60) Provisional application No. 60/229,048, filed on Aug. 31, 2000.

(51) Int. Cl.$^7$ ............................................. F16H 61/28
(52) U.S. Cl. ........................... 74/336 R; 477/79; 701/56
(58) Field of Search ......................... 74/336 R; 477/79, 477/80, 81; 701/56

(56) References Cited

U.S. PATENT DOCUMENTS 3,894,442 A   7/1975   Hembree
5,299,652 A   4/1994   Bevins
6,243,637 B1 * 6/2001  Minowa et al. ............... 477/31
6,257,081 B1  7/2001   Gagnon et al.
6,295,498 B1 * 9/2001  Gleason et al. ............. 477/121

FOREIGN PATENT DOCUMENTS

CA        2250978        10/1998

* cited by examiner

Primary Examiner—Rodney H. Bonck
Assistant Examiner—Dennis Abdelnour
(74) Attorney, Agent, or Firm—Pillsbury Winthrop LLP

(57) ABSTRACT

A transmission system for a straddle vehicle offers an automatic mode based on preprogrammed values for consistent shifting each time certain engine conditions are encountered. A variety of preset shifting parameters may be provided to allow different shifting modes. By this, an operator can select the degree of aggressiveness of the transmission. The automatic transmission may be modulated so that a preset shifting delay is provided to allow the operator to experience the sensation of shifting.

49 Claims, 12 Drawing Sheets

TRANSMISSION SYSTEM FOR A STRADDLE TYPE VEHICLE

This application claims priority under 35 U.S.C. §119(e) of U.S. provisional application No. 60/229,048 filed Aug. 31, 2000, the entirety of which is incorporated by reference. This application is related to U.S. Pat. No. 6,257,081, which is also incorporated by reference herein.

BACKGROUND OF THE INVENTION

1. Field of the Invention

The invention relates to a transmission system for a vehicle, such as a straddle type vehicle or the like. More particularly, the invention relates to various types of transmission systems that function automatically or semi-automatically.

2. Description of Related Art

Internal combustion engines generally installed in vehicles, such as rider mounted or straddle type vehicles or the like, develop their power output at high speeds of rotation. It is therefore necessary to reduce the speed between the crankshaft and the shaft that drives the wheels. However, the torque that the engine delivers can be varied only within narrow limits. For this reason, it is necessary to be able to alter the transmission ratio, so that the driving forces applied to the wheels of the vehicle can be adapted to varying road resistance conditions.

The speed reduction can be obtained by means of a transmission (change-speed gearbox) interposed between a clutch and a final drive. Such a transmission alters the torque that is transmitted. The transmission may include a main shaft, a secondary shaft and an output shaft (connected to the wheels). A multiple disk transmission clutch may be mounted on one end of the main shaft and a dog clutch body, or shift fork, may be slidably mounted on a shaft for changing the transmission gear ratio.

When an operator wants to start a straddle type vehicle with a manual transmission, he or she has to increase the speed of the engine, gradually depress a clutch lever and move a toe shift pedal to engage the first gear train of the transmission. Having the first speed gear train engaged and increasing the speed, the operator has to depress the clutch lever to disengage the transmission clutch and move the toe shift pedal to change the transmission gear ratio of the engine. Because operation of the clutch lever or toe shift pedal may be disagreeable or difficult, some prior transmission systems have been developed wherein the clutch lever is not present or operation of the toe shift pedal is eased.

U.S. Pat. No. 3,894,442 discloses a semi-automatic gear shifting apparatus for shifting gears in a gear box of a motorcycle. The gears are shifted by rotating a spindle. The spindle is operably connected to a ratchet-type gear shifting means. A lever arm is connected at one end to the spindle and is connected at its other end to a toe pedal of a motorcycle by means of a mounting bracket. A solenoid connecting rod is operably connected to a core of the solenoid. The rod is operably connected at one end to the toe pedal. The rod is thus reciprocated to move the lever arm and the spindle by the solenoid, which is actuated by a pair of push button switches connected to an electrical power source. The spindle is rotated through a relatively small arc. The degrees of the arc are determined by the distance the ratchet is required to move to effect a change in the gears in the gear box.

The semi-automatic gear shifting apparatus is activated when energized selectively through the switches. Each time the apparatus is activated one gear shifting cycle is completed. When the apparatus is de-activated, the lever arm is returned to the neutral position. The use of a gear disengaging clutch (and a clutch lever) is not required here because the movement of the shifting lever arm is sufficiently rapid so as to not damage the gear while effecting the gear shift.

However, experience has shown that under certain operating conditions, the movement of the shifting lever arm may be difficult, and a very powerful solenoid is thus required. Moreover, having an exposed solenoid mounted on the engine may be hazardous because its operation may be jeopardized by roadway debris or impediments during driving.

U.S. Pat. No. 5,299,652 discloses a handlebar control system for a motorcycle that enables control of a motorcycle without moving the hands from the handlebars. A shift switch with an up-shift button and a down-shift button is provided on a right handlebar while the left handlebar has a normal clutch lever mounted thereon. An advanced shift arm is connected at one end to a shift rod while the other end is connected to an actuator, whereby, in operation, the actuator causes movement of the shift arm to change the transmission gear ratio. The system also comprises an air compressor that maintains an operating pressure of about 100 p.s.i., a tank, a pneumatic line, an up-shift control solenoid, a down-shift control solenoid and an electric circuit connected to a twelve volt battery.

In operation, an operator depresses the clutch lever and then the up-shift button, which causes the up-shift control solenoid to open to permit a burst of air to flow to the actuator to change the transmission gear ratio. Down-shifting occurs by pushing the down-shift button. The system may also comprise an optional pneumatic stop switch for operating the transmission without using the clutch lever. However, this system requires a lot of space and is not adapted to be mounted in a restrictive area. Moreover, having an exposed actuator may be hazardous because its operation may be jeopardized by roadway debris during driving.

However, prior art semi-automatic transmissions installed on a straddle type vehicle have some inconveniences, such as requiring the operation of a shift toe pedal. This operation may be difficult because an important effort is required from the operator when the temperature is below a certain point. Also, for an operator who wears large boots, operation of a shift toe pedal may be complicated. Thus, it would be beneficial to eliminate a shift toe pedal to result in a more user-friendly transmission system.

Additionally, prior art semi-automatic and automatic transmissions typically either forego the use of the clutch or re-engage the clutch very abruptly subsequent to gear shift. Accordingly, these transmissions shift very roughly, thereby decreasing rider comfort and, perhaps causing undue wear on the transmission componentry. There is thus a need in the art to provide a semi-automatic or automatic transmission that is capable of shifting smoothly.

Furthermore, semi-automatic and automatic transmissions have lacked an ability to adjust the aggressiveness of shifting. In particular, the shift commands with which the transmission controller initiates gear shifting has been based on, either directly or indirectly, engine speed. Therefore, no matter the operating conditions of the vehicle at that time, the controller shifts gears when the predetermined engine speed is obtained. Accordingly, these systems may cause erratic or inconvenient shift changes. There is thus a need in the art to provide a semi-automatic or automatic transmission with the ability to determine or otherwise realize the current operating conditions of the vehicle and provide responsive shift changes.

SUMMARY OF THE INVENTION

One aspect of embodiments of the invention is to provide a semi-automatic or automatic transmission that allows the operator to adjust the operating parameters.

Another aspect of embodiments of the invention is to provide a semi-automatic or automatic transmission that is capable of smoothly shifting gears.

Another aspect of embodiments of the invention is to provide a semi-automatic or automatic transmission that is capable of realizing operating conditions of the vehicle and providing responsive shift changes.

In accordance with this invention an automatic transmission assembly is provided that comprises an engine with a crankshaft that rotates at a speed and a transmission operatively connected to the crankshaft. The transmission includes a main shaft, an output shaft, a plurality of speed gear trains disposed between the main shaft and the output shaft, a gear shifter selectively connected to one of the speed gear trains that causes the selected gear train to engage the output shaft, and a clutch device connected to the main shaft that selectively disengages the main shaft from the crankshaft to permit shifting between the speed gear trains. Driving torque is transmitted from the crankshaft to the main shaft and through the selected speed gear train to the output shaft. A shifting mode selector selects between plural modes of shifting operation. A controller is provided in communication with the shifting mode selector, the clutch device and the gear shifter that controls the clutch device to engage and disengage the main shaft from the crankshaft and controls the gear shifter to select one of the plurality of speed gear trains based on a selected shifting mode. The controller includes an input connected to the engine, an output connected to the clutch device and the gear shifter, and a memory in which a plurality of sets of values are stored that control gear change shifting based on sensed operating conditions, wherein each set of values corresponds to a different shifting mode.

Also in accordance with this invention a method is provided of controlling automatic shifting of a transmission associated with an engine that provides torque, wherein the transmission includes a clutch, a plurality of speed gear trains, and a gear shifter. The method includes selecting a shifting mode from a plurality of modes each based on different engine operating conditions, sensing engine operating conditions, comparing sensed engine operating conditions to stored, predetermined engine conditions in the selected mode to determine when shifting will occur, operating the clutch to disengage torque transmission to permit shifting, operating the gear shifter to select a speed gear train, and operating the clutch to engage torque transmission to the speed gear train.

The invention can also be embodied in a recording medium that stores a control program for controlling a transmission having a clutch and a gear shifter. The recording medium includes instructions for causing the transmission to select a shifting mode from a plurality of modes each based on different engine operating conditions, sense engine operating conditions, compare sensed engine operating conditions to stored, predetermined engine conditions in the selected mode to determine when shifting will occur, operate the clutch to disengage torque transmission to permit shifting, operate the gear shifter to select a speed gear train, and operate the clutch to engage torque transmission to the speed gear train.

Another feature of this invention relates to an automatic transmission assembly comprising an engine with a crankshaft that rotates at a speed and a transmission operatively connected to the crankshaft. The transmission includes a main shaft, an output shaft, a plurality of speed gear trains disposed between the main shaft and the output shaft, a gear shifter selectively connected to one of the speed gear trains that causes the selected gear train to engage the output shaft, a clutch device connected to the main shaft that selectively disengages the main shaft from the crankshaft to permit shifting between the speed gear trains, and a clutch actuator connected to the clutch to actuate clutching action. Driving torque is transmitted from the crankshaft to the main shaft and through the selected speed gear train to the output shaft. A controller is provided in communication with the clutch actuator and the gear shifter that controls the clutch actuator to cause the clutch device to engage and disengage the main shaft from the crankshaft and controls the gear shifter to select one of the plurality of speed gear trains based on a selected shifting mode. The controller includes an input connected to the engine, an output connected to the clutch actuator and the gear shifter, and a memory in which a plurality of sets of values are stored that modulate the clutch actuator to control the clutch device based on sensed operating conditions.

The invention also includes a method of modulating shifting in a transmission including a clutch and a clutch actuator, comprising sensing engine operating conditions, comparing sensed engine operating conditions to stored, predetermined engine conditions to determine a modulation value for the clutch actuator, operating the clutch to disengage torque transmission to permit shifting, operating the gear shifter to select a speed gear train, and operating the clutch to engage torque transmission to the speed gear train based on the modulation value, wherein the clutch engages the torque transmission with a predetermined delay based on the modulation value.

The invention can be embodied as a recording medium that stores a control program for controlling shifting in a transmission having a clutch, a clutch actuator and a gear shifter. The recording medium including instructions for causing the transmission to sense engine operating conditions, compare sensed engine operating conditions to stored, predetermined engine conditions to determine a modulation value for the clutch actuator, operate the clutch to disengage torque transmission to permit shifting, operate the gear shifter to select a speed gear train, and operate the clutch to engage torque transmission to the speed gear train based on the modulation value, wherein the clutch engages the torque transmission with a predetermined delay based on the modulation value.

The assemblies, methods and recording mediums embodied herein can be used in combination with various types of vehicles, including for example, a straddle type vehicle.

Other aspects, objects and features of the invention will become apparent by reference to the following specification and to the drawings.

BRIEF DESCRIPTION OF THE DRAWINGS

A detailed description of preferred embodiments of the invention is provided herein with reference to the following drawings, wherein.

Figure 1:
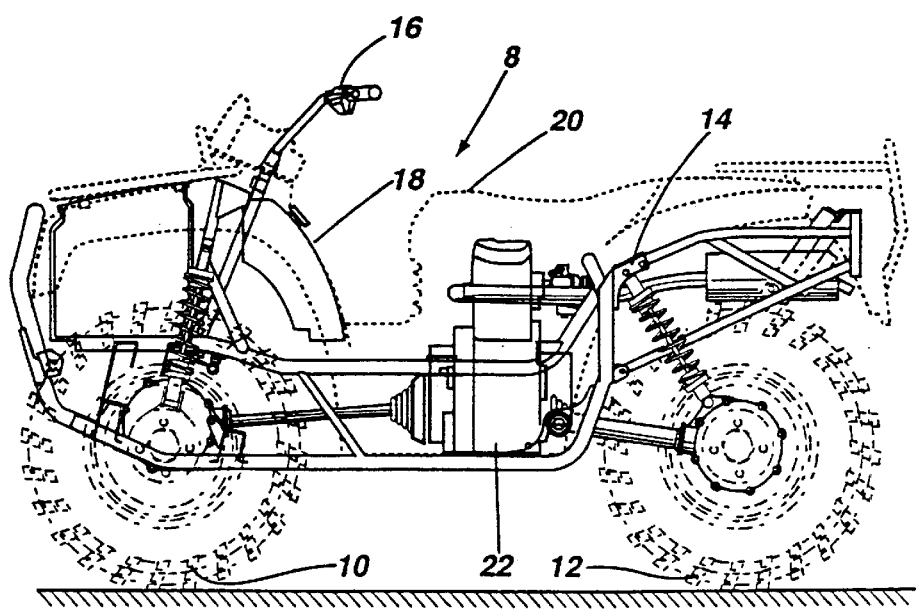
FIG. 1 is a side elevational view in partial phantom of a straddle type vehicle for use with embodiments of the invention.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF PREFERRED EMBODIMENTS

The invention is described in reference to a straddle type vehicle for purposes of illustration only. The particular vehicle disclosed for illustration is a four wheeled all terrain vehicle (ATV). The transmission system disclosed herein can be used in any type of driven machinery, especially vehicles.

FIG. 1 illustrates a straddle type vehicle 8 wherein a pair of front wheels 10 and a pair of rear wheels 12 are suspended on the front end and on the rear end, respectively, of a body frame 14. A steering bar 16, a tank 18 and a seat 20 are mounted on frame 14 from the front to the rear as seen in FIG. 1. A power unit 22 for driving front wheels 10 and rear wheels 12 is mounted on frame 14.

Figure 3A:
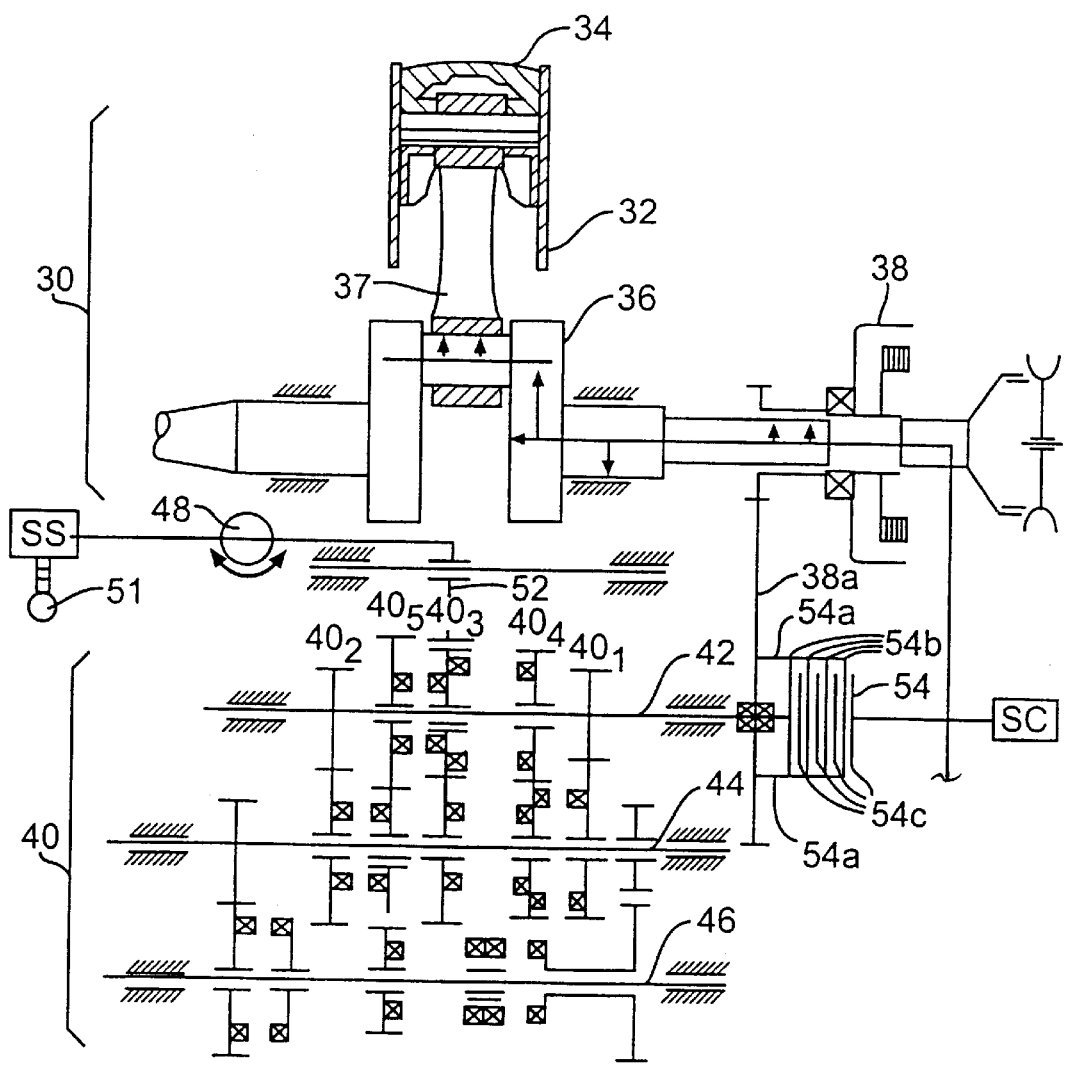
FIG. 3A is a diagrammatic view of a semi-automatic transmission system constructed in accordance with an embodiment of the invention.

As illustrated in FIG. 3A, an engine 30 comprises a cylinder 32, a piston 34 slidably mounted in cylinder 32, a crankshaft 36 and a connecting rod 37 interconnecting piston 34 and crankshaft 36. A centrifugal starting clutch 38 is mounted on a front end of crankshaft 36. A transmission 40 is integrated with engine 30 wherein a casing (not shown) serves both as a crankcase for engine 30 and a transmission case for transmission 40. Of course, any switch crankcase can be used. Engine 30 and transmission 40 thus form, at least in part, power unit 22.

Transmission 40 has a main shaft 42, a secondary shaft 44 and an output shaft 46. A shift drum 48 is connected to shift forks 52. Shift forks 52 are operated for changing the gear ratio of transmission 40. Transmission 40 includes a first speed gear train $40_1$, a second speed gear train $40_2$, a third speed gear train $40_3$, a fourth speed gear train $40_4$, and a fifth speed gear train $40_5$. A multiple disk transmission clutch 54 is mounted on one end of main shaft 42.

It is contemplated that the transmission 40 may be operated semi-automatically or automatically. It is noted that the term "semi-automatic" refers to the ability of the transmission 40 to change gears (effectively "automatically") at the command of the rider (such as with a control switch), while the term "automatically" refers to the ability of the transmission 40 to change gears without need of commands from the rider. Either of the embodiments of transmission 40 shown in FIG. 3A or 4A may be adapted to operate semi-automatically or automatically.

Figure 2:
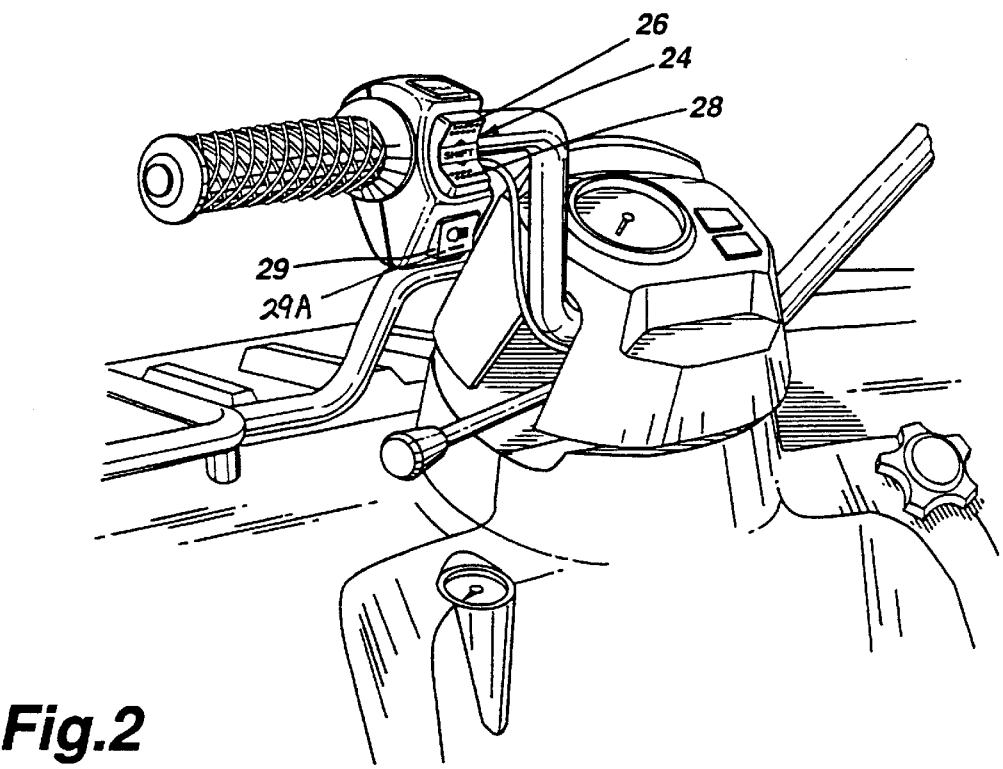
FIG. 2 is a partial perspective view of a steering bar of the vehicle of FIG. 1 showing a switching means with up-shift, down-shift and operating-mode buttons.

As mentioned above, operation of the semi-automatic transmission 40 requires the use of a rider-actuated control switch. Referring to FIG. 2, a switching mechanism 24 comprises an up-shift momentary contact button switch 26 and a down-shift momentary contact button switch 28 of the type wherein an electrical circuit is closed when button switches 26 or 28 are depressed and opened when button switches 26 and 28 are not depressed. Each of the button switches 26 and 28 has a power source lead wire (not shown) electrically attached thereto and is connected to a power source (not shown). Each of the button switches 26 and 28 has a solenoid or an Electronic Control unit (ECU) connecting lead wire (not shown). The switching mechanism 24 has an operating-mode button 29, which permits an operator to select between a semi-automatic transmission system and an automatic transmission system. Therefore, the transmission 40 may be selectively operated in either of the semi-automatic or automatic modes according to the selection of the rider. Of course, any other known type of switching mechanism can be used. Additionally, an indicator 29A can be provided to show the driver whether the vehicle is operating in an automatic or semi-automatic mode. Indicator 29A can be a light or other signaling device. Alternatively, the vehicle can be provided with only one type of transmission system, such a fully automatic system.

Exemplary Embodiments of Semi-automatic Transmission Systems

Figure 4A:
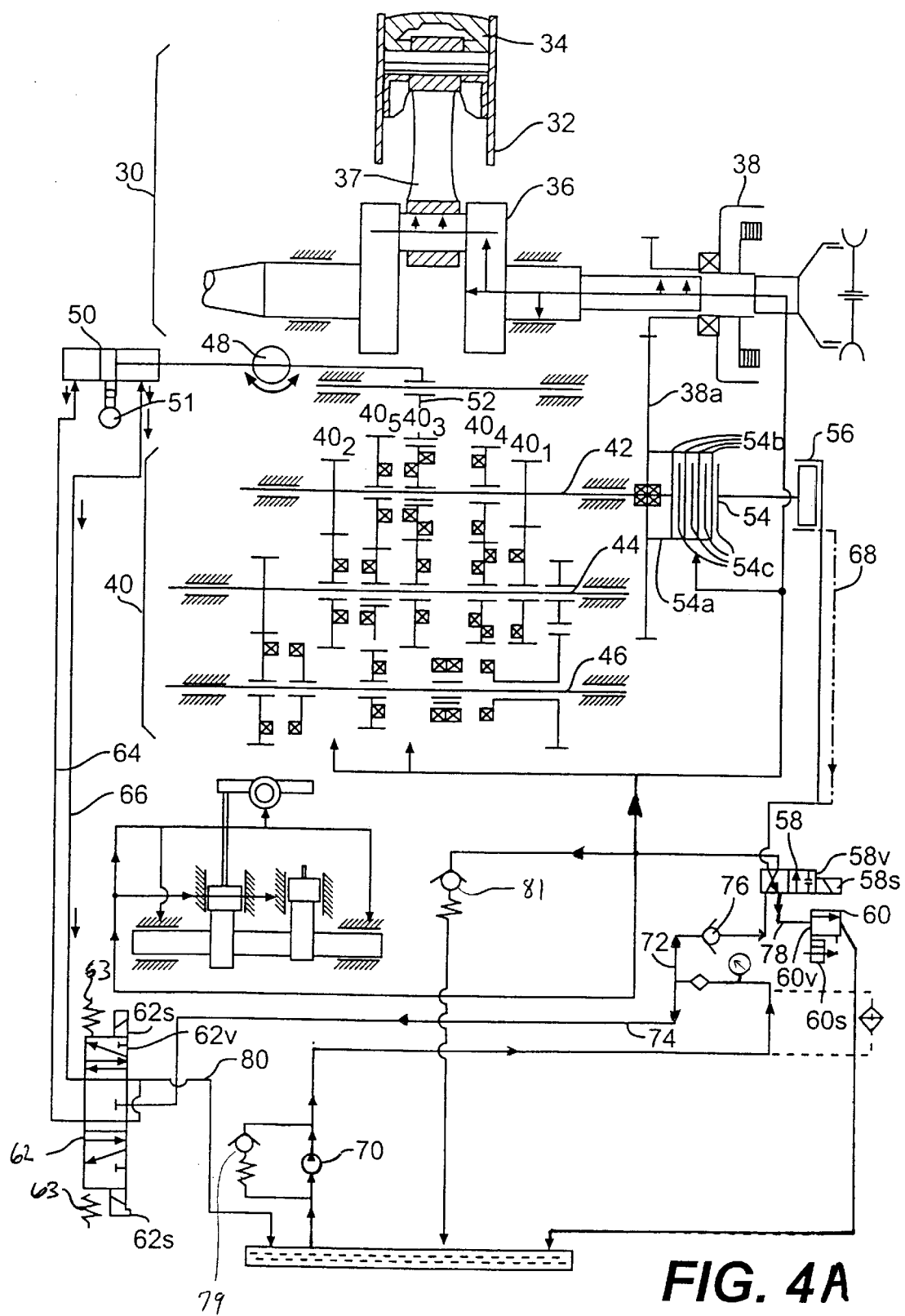
FIG. 4A is a diagrammatic view of a semi-automatic transmission system constructed in accordance with another embodiment of the invention.

As discussed previously, either of the embodiments of the transmission 40 shown in FIGS. 3A and 4A are capable of being selectively operated as a semi-automatic or automatic system.

The structure and operation of a semi-automatic system constructed in accordance with an embodiment of the invention is described hereinafter with reference to FIGS. 3A and 3B.

Engine 30 must have a certain minimum speed before it can run on its own power and develop a sufficiently high torque to drive the mechanism, in this case straddle type vehicle 8. Thus, to prevent power from being transmitted from crankshaft 36 to transmission clutch 54 at low rotating speeds, centrifugal clutch 38 remains disengaged. When the operator increases the speed of engine 30, centrifugal clutch 38 is engaged automatically. As the rotational speed of crankshaft 36 increases, the output torque of crankshaft 36 is transmitted through centrifugal clutch 38 and transmission clutch 54 to main shaft 42. The clutch 54 is coupled with a gear 38a in a conventional manner. For example, the gear 38a is mounted on the main shaft 42 using bearings or bushings, such that the gear 38a can rotate relative to the main shaft 42. The gear 38a is connected to a clutch wall 54a that rotates with the gear 38a and at least one of a plurality of plates 54b of the clutch 54. At least one of a plurality of plates 54c of the clutch 54 is fixedly coupled to the main shaft 42. The plates 54b and 54c are axially movable between frictionally engaged positions and non-engaged positions. Rotational movement is transferred from the starting clutch 38 to the output shaft of the engine 30, the gear 38a, clutch wall 54a and at least one of the plates 54b. Coupling of plates 54b and 54c controls rotation of main shaft 42. The torque of main shaft 42 is transmitted through first speed gear $40_1$, and secondary shaft 44 to drive output shaft 46.

Figure 6A:
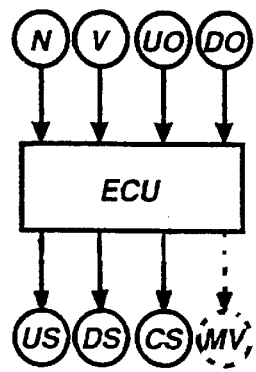
FIG. 6A is a diagrammatic view of a control assembly used in the semi-automatic transmission system.

It is contemplated that an ECU may be used to facilitate shifting the semi-automatic system. As shown in FIG. 6A a preferred embodiment of an ECU controls a SC (Solenoid-Clutch) and a SS (Solenoid-Shift) in a semi-automatic transmission system constructed in accordance with an embodiment of the invention. The control system is preferably implemented on a programmed general purpose computer ECU, typically used in vehicle control systems. However, the control system can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown and described herein, can be used to implement the control system according to the various embodiments of this invention.

A plurality of electrical signal inputs are provided to the ECU. Input N varies linearly with engine speed (RPM) (which may be measured from the rotation speed of the transmission clutch 54). Input V varies linearly with the vehicle speed (which may be measured from the rotation speed of main shaft 42). Inputs UO and DO vary according to an up-shift and a down-shift command, respectively. One or more of the input signals to the ECU is/are used to generate three output signals: an output CS for actuating SC and outputs US and DS for actuating SS.

With a gear engaged and the semi-automatic transmission selected by the operator with mode button 29, when the operator depresses the up-shift button 26, up-shifting occurs as follows. Referring to FIG. 3B, input UO is read by the ECU, an output CS is generated and SC is actuated to disengage the transmission clutch 54 to permit smooth shifting. At the same time, output US is also generated by the ECU and, after an activating delay, SS is also activated. SS activates shift forks 52, which move in order to engage second speed gear $40_2$. Obviously, the shifting occurs while transmission clutch 54 is disengaged.

Once shifting is complete, transmission clutch 54 must be re-engaged so that the output torque of crankshaft 36 is transmitted through transmission clutch 54 to main shaft 42 and the torque of main shaft 42 is transmitted through second speed gear $40_2$ and secondary shaft 44 to output shaft 46.

Thus, the ECU ceases generation of output CS to deactivate SC to re-engage the transmission clutch 54. However, to permit a smooth engagement between transmission clutch 54 and main shaft 42, a certain amount of slippage is permitted during such engagement.

Indeed, is understood that without any slippage between transmission clutch 54 and main shaft 42, a substantial gear shift shock may occur, especially if the operator simultaneously increases or decreases the engine speed in a significant manner. The amount of slippage may be controlled by the ECU, which modulates SC (decreases/increases voltage input to SC at a controlled rate) to gradually re-engage SC to allow for some degree of slippage.

Figure 3B:
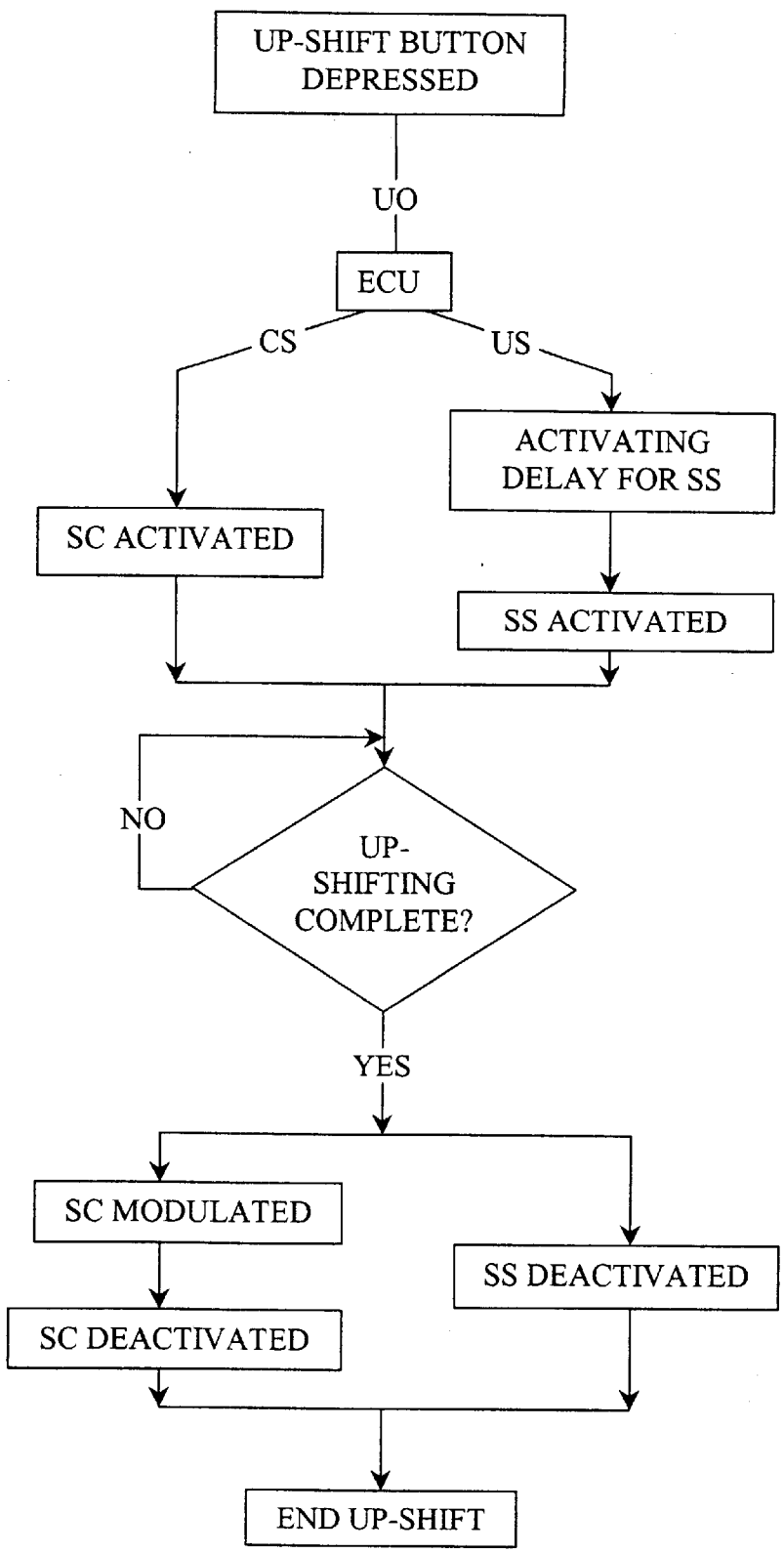
FIG. 3B is a flow chart illustrating an up-shift sequence for the semi-automatic transmission system shown in FIG. 3A.

In the up-shift sequence illustrated in FIG. 3B, the modulation of SC may be performed in accordance with V and N. Modulation of SC thus controls the frictional engagement of plates 54b, 54c, which increases at a specific rate as long as the rotation speeds of transmission clutch 54 and main shaft 42 are not substantially synchronized. Once synchronization occurs, modulated SC is deactivated. It is contemplated that the deactivation of SC may be additionally controlled by a predetermined time duration, such that upon passage of the predetermined time duration, SC is deactivated even if substantial synchronization has not yet occurred. Alternatively, a specific time duration alone may be used by the ECU, in lieu of V and N, to control the slippage of clutch 54, such that the slippage is not based on synchronization at all.

In the up-shift sequence illustrated in FIG. 3B, it is also possible to add an ignition timing retard, which may be activated when the up-shift button is depressed. This ignition timing retard will only be deactivated once the engine is synchronized with the transmission at the end of the up-shifting operation.

Down-shifting is accomplished in a manner similar to that of up-shifting shown in FIG. 3B. In particular, while the operator depresses down-shift button 28, input DO is read by the ECU, an output CS is generated, and SC is activated. In so doing, SC disengages transmission clutch 54 to permit a smooth shift. At the same time, output DS is also generated and, after an activating delay, SS is also activated. SS operates shift forks 52, which move to a lower speed gear. Obviously, down-shifting occurs while transmission clutch 54 is disengaged.

Once down-shifting is complete, transmission clutch 54 must be re-engaged. The ECU ceases generation of output CS to deactivate SC. In so doing, the re-engagement of transmission clutch 54 is permitted. As described above, the ECU allows a smoother down-shift by controlling the amount of slippage between transmission clutch 54 and main shaft 42. As described above, the ECU may control the slippage of clutch 54 based on V and N, either directly or indirectly, or based on a specific duration of time, or a combination of both, as described previously.

It is understood that the ECU used in the semi-automatic transmission system described above may have other inputs provided to it to improve such system. For example, an input T that varies with the position of shift forks 52 may be used. An input ST that varies with the position of the sub-transmission (HI, LO) may be used. An input A that varies with the throttle opening may be used. An input L may also be generated to the ECU. Such input L may based on input N (a predetermined maximum engine speed) and on input A (a specific throttle opening). Input L may be used by the ECU when the ECU determines that the shifting operation is not appropriate and prevents such shifting operation. Input L may also be used by the ECU wherein the ECU activates a warning light to indicate to the operator that he or she has to up-shift. The ECU may also read the engine speed N when an input UO to DO is generated for determining if SC and SS shall or shall not be activated. Finally, the ECU may also momentarily reduce the engine speed and/or power shifting may occur by altering the ignition timing, cutting the ignition or varying the fuel supply.

The structure and operation of a semi-automatic system constructed in accordance with another embodiment of the invention is described hereinafter with reference to FIGS. 4A–4C. In this particular embodiment, an example of a hydraulic circuit is shown to control slippage, rather than the electric solenoid SC. Systems shown in FIGS. 4A and 4D are similar to one another, with the only significant difference is that in the Embodiment of FIG. 4A, a check valve 76 is utilized. Function of the check valve 76 is discussed below.

Elements similar to those in FIG. 3A are referred to with the same reference numerals. As described above, centrifugal starting clutch 38 is mounted on a front end of crankshaft 36. Shift drum 48 is connected to shift forks 52, which are operated for changing the gear ratio of transmission 40. Transmission 40 includes first speed gear train $40_1$, through fifth speed gear train $40_5$.

The multiple disk transmission clutch 54, which is activated by a transmission clutch actuator 56, is mounted on one end of main shaft 42. A clutch valve-solenoid 58 with a pressure modulated valve-solenoid 60 mounted thereon is connected to clutch actuator 56. Clutch valve-solenoid 58 comprises a valve 58V and a solenoid 58S, and modulated valve-solenoid 60 comprises a valve 60V and a solenoid 60S. A shift valve-solenoid 62, comprising a valve 62V and two solenoids 62S, is connected to shift actuator 50. The shift valve-solenoid 62 also includes a pair of return springs 63 to maintain a centered position of the shift valve-solenoid 62 when the shift valve-solenoid 62 is not actuated. Shift actuator 50 also has a return spring 51 for maintaining shift actuator 50 in a neutral position when it is not actuated.

Shift hoses (e.g., hydraulic hoses) 64 and 66 are installed between shift actuator 50 and shift valve-solenoid 62, and clutch hose 68 is installed between clutch actuator 56 and clutch valve-solenoid 58. A pump (e.g., a hydraulic pump) 70 provides pressurized oil (e.g., hydraulic fluid) to clutch valve-solenoid 58 and shift valve-solenoid 62 through a pressurized clutch hose 72 and a pressurized shift hose 74, respectively. A check valve 76 is installed on pressurized clutch hose 72 between pump 70 and clutch valve-solenoid 58 to prevent any loss of pressure. Check valve 76 may, however, be omitted by selecting a return spring 51 having a load force that is higher than clutch actuator operating pressure. A discharge clutch hose 78, which passes through pressure modulated valve-solenoid 60, is mounted on clutch valve-solenoid 58. A discharge shift hose 80 is mounted on shift valve-solenoid 62.

Of course, pump 70 may be any suitable pump such as an oil pump or hydraulic pump, which provides pressurized oil (e.g., hydraulic fluid) through the semi-automatic transmission system. Also, hoses 64, 66, 68, 72, 74 and 78 (hydraulic hoses) may be replaced by internal passages located in the power unit 22 or other conduit mechanisms. Pump 70 may also provide lubrication for the power unit 22, including engine 30 and transmission 40. For this arrangement, fluid used to lubricate the engine 30 and transmission 40 is also used for actuation of actuators 50 and 56. It is noted however, that the fluid must be pressurized above a pressure used to deliver fluid for lubrication in order to facilitate operation of the actuators 50 and 56. To prevent over-pressurization of the system, a main pressure regulator 79 is provided within the system. The regulator 79 is set at a predetermined relatively high pressure and is communicated with a fluid reservoir, such that if pressure within the system exceeds this pressure, the fluid is allowed to flow through the regulator back the reservoir. To maintain a relatively lower pressure during normal operating conditions, another regulator 81 may be used, which is set at another predetermined, relatively lower pressure, such that the pressure within the system is not allowed to exceed this relatively lower pressure. To boost pressure within the system prior to any shifting operation, the regulator 81 is deactivated to allow the system pressure to build to the relatively high pressure determined by the regulator 79.

It is contemplated that the ECU shown in FIG. 6A and discussed previously herein may alternatively be used with the embodiment of the invention shown in FIG. 4A. As previously explained, a plurality of electrical signal inputs are provided to the ECU. Input N varies linearly with engine speed (RPM) (which may be measured from the rotation speed of the transmission clutch 54). Input V varies linearly with the vehicle speed (which may be measured from the rotation speed of main shaft 42). Inputs UO and DO vary according to an up-shift and a down-shift command, respectively.

One or more of the input signals to the ECU is/are used to generate four output signals: an output CS for actuating the clutch solenoid 58, outputs US and DS for actuating the shift solenoid 62, and an output MV for controlling the modulated valve-solenoid 60.

With a gear engaged and the semi-automatic transmission selected by the operator with mode button 29, when the operator depresses the up-shift button 26, up-shifting occurs as follows.

Input UO is read by the ECU, an output CS is generated and clutch valve-solenoid 58 is then activated. Clutch valve-solenoid 58 permits the pressurized fluid located in pressurized clutch hose 72 to pass through clutch hose 68 for actuating clutch actuator 56. In so doing, clutch actuator 56 disengages transmission clutch 54 to permit smooth shifting. At the same time, output US is also generated by the ECU and, after an activating delay, shift valve-solenoid 62 is also activated. Shift valve-solenoid 62 then permits the pressurized fluid located in pressurized shift hose 74 to pass through shift hose 66 for actuating shifting actuator 50. Shifting actuator 50 activates shift forks 52, which move in order to engage a consecutively higher speed gear. Obviously, the shifting occurs while transmission clutch 54 is disengaged. Once shifting is complete, transmission clutch 54 must be re-engaged so that the output torque of crankshaft 36 is transmitted through transmission clutch 54 to main shaft 42 and the torque of main shaft 42 is transmitted through the higher speed gear and secondary shaft 44 to output shaft 46. Preferably, a delay is introduced to ensure that the gear is fully engaged prior to re-engaging the clutch 54.

Thus, the ECU generates another output CS to deactivate clutch valve-solenoid 58. In doing so, clutch valve-solenoid 58 blocks the pressurized fluid from pressurized clutch hose 72 and permits the fluid to drain from clutch actuator 56 through clutch hose 68, through clutch valve-solenoid 58, through discharge clutch hose 78 and through modulated valve-solenoid 60. Engagement of transmission clutch 54 is then permitted. However, to permit a smooth engagement between transmission clutch 54 and main shaft 42, a certain amount of slippage is permitted during such engagement.

As with the embodiment described above and shown in FIG. 3, the amount of slippage may be controlled by the ECU. With the embodiment shown in FIG. 4, however, the modulated valve-solenoid 60 is controlled by the ECU to gradually (relatively, at a predetermined rate) decrease the pressure within the clutch actuator 56 to correspondingly gradually re-engage the plates 54b, 54c of the clutch 54. Thus, the modulated valve-solenoid 60 effectively "modulates" the clutch actuator 56 or, in other words, decreases the pressure within the clutch actuator 56 according to a rate determined and controlled by the ECU. It can be understood then that a relatively slow reduction of the pressure within the clutch actuator 56 corresponds to a relatively large amount of slippage, while a relatively rapid reduction of the pressure within the clutch actuator 56 corresponds to a relatively small amount of slippage. Furthermore, due to the ability of the ECU to control slippage by the modulation of the clutch actuator 56 via the modulated valve-solenoid 60, the amount of slippage called for may be adjusted based on various parameters input to or generated by the ECU.

Figure 4B:
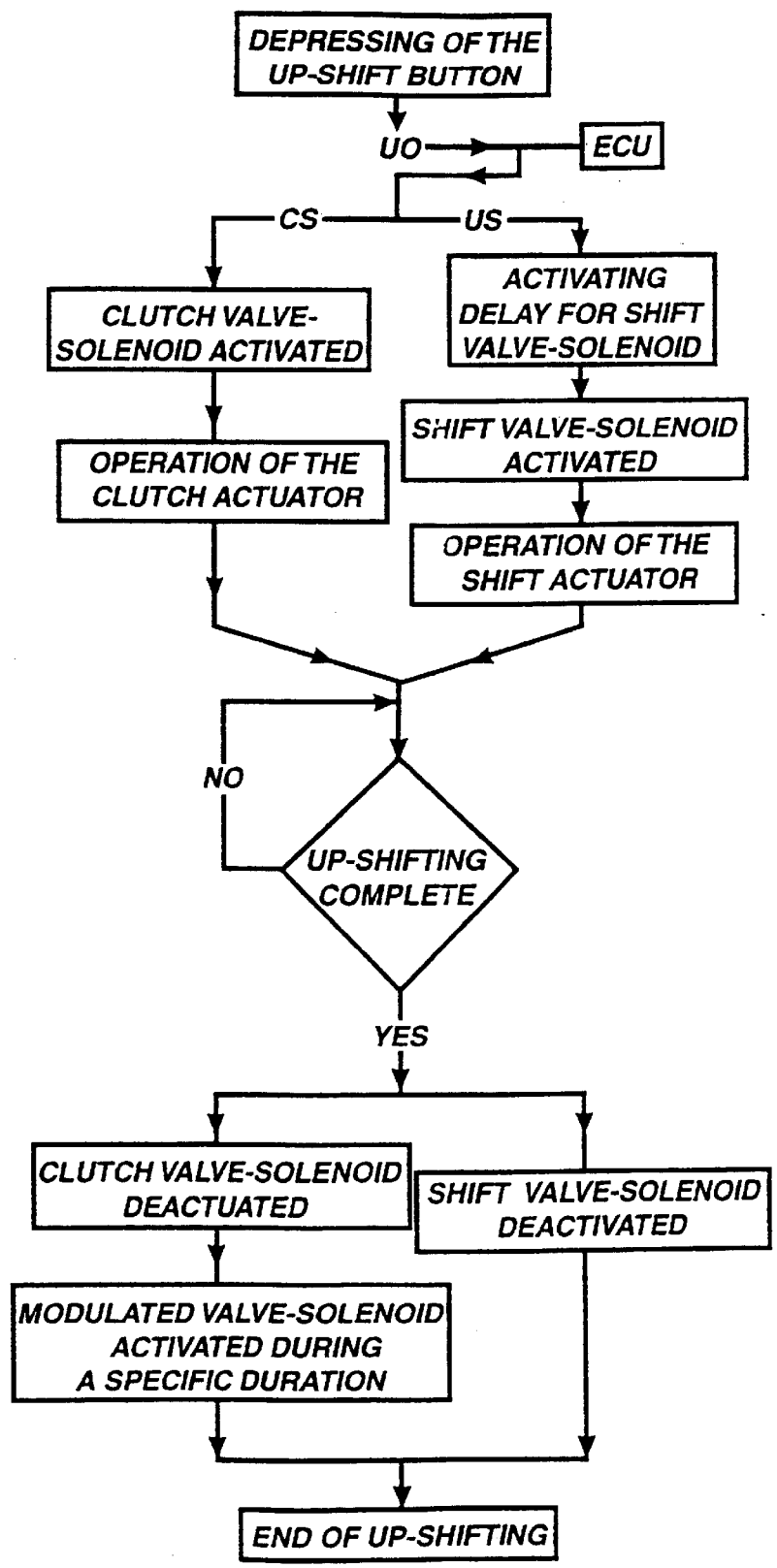
FIG. 4B is a flow chart illustrating an up-shift sequence for the semi-automatic transmission system illustrated in FIG. 4A.

FIG. 4B illustrates the modulated valve-solenoid 60 modulated for a predetermined period of time. In contrast, FIG. 4C illustrates the modulated valve-solenoid 60 modulated according to synchronization. In particular, FIG. 4C illustrates an alternative up-shift sequence that may be performed according to the present invention. This up-shift sequence is similar to the one illustrated in FIG. 4B, but modulated valve-solenoid 60 is here activated for a pressure control determined by the ECU based on engine speed and vehicle speed (directly or indirectly). Modulated valve-solenoid 60 is thus activated after a short specific period of time so that plunger 60P prevents any flow of fluid from discharge clutch hose 78 through port 60O for creating such pressure control. Afterwards, modulated valve-solenoid 60 will control a discharge pressure of fluid from clutch actuator 56 for controlling the duration of slippage during the re-engagement of the transmission clutch 54. (It is noted that the rate of modulation of the modulated valve-solenoid 60 is discussed below.) A deactivating delay is also added for controlling the termination of operation of shift valve-solenoid 62.

Figure 4C:
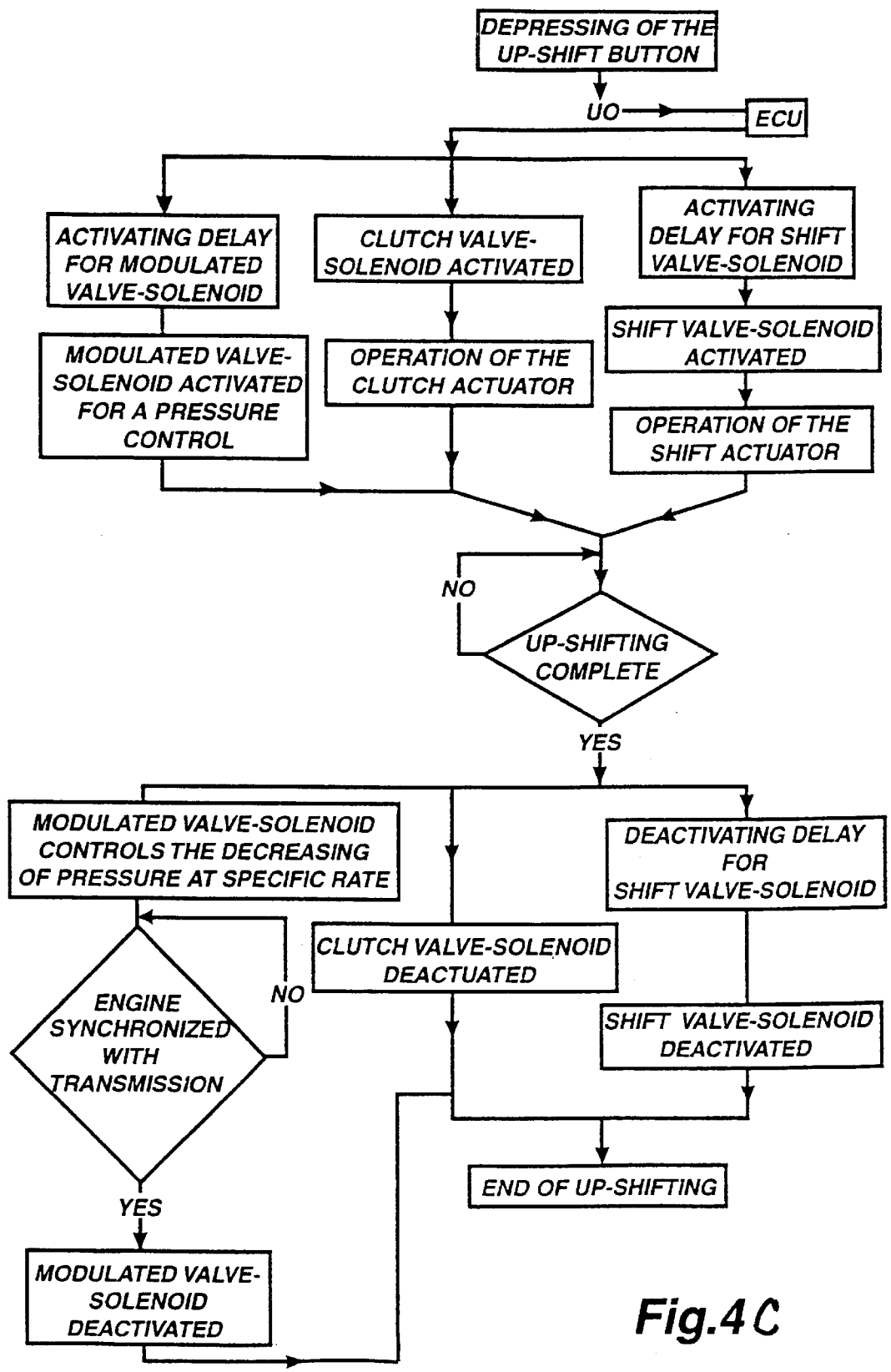
FIG. 4C is a flow chart illustrating another up-shift sequence for the semi-automatic transmission system illustrated in FIG. 4A.
Figure 4D:
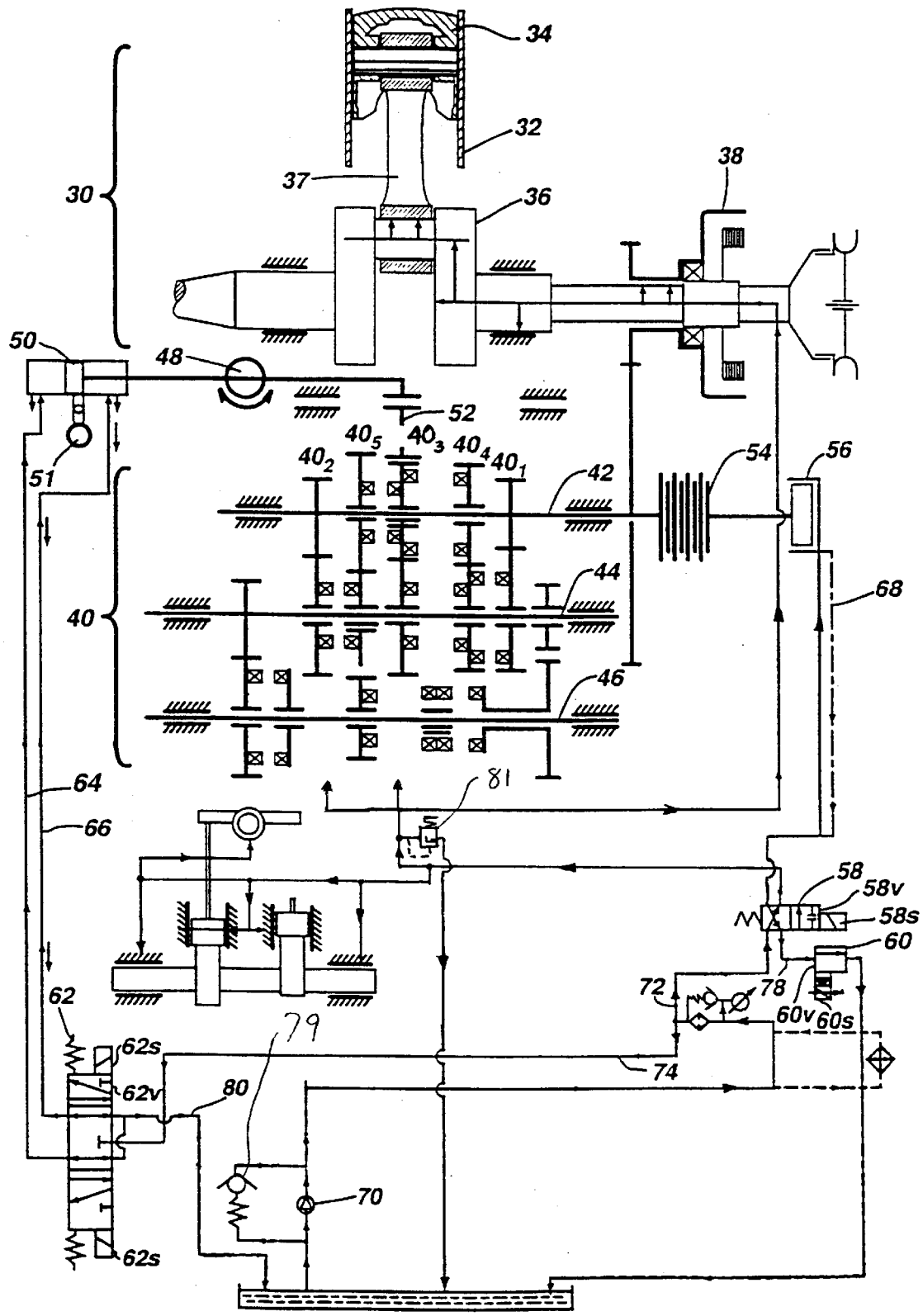
FIG. 4D is a diagrammatic view of a semi-automatic transmission system constructed in accordance with another embodiment of the invention.

Hence, in the up-shift sequence illustrated in FIG. 4C, instead of monitoring modulated valve-solenoid 60 according to a specific duration of time as illustrated in FIG. 4B, the ECU monitors modulated valve-solenoid 60 in accordance with V and N. Modulated valve-solenoid 60 thus controls the pressure of fluid in clutch actuator 56, which decreases at a specific rate as long as the rotation speeds of transmission clutch 54 and main shaft 42 are not substantially synchronized. Once synchronization occurs, modulated valve-solenoid 60 is deactivated. It is contemplated that the deactivation of the modulated valve-solenoid 60 may be additionally controlled by a predetermined time duration, such that upon passage of the predetermined time duration, the modulated valve-solenoid 60 is deactivated even if substantial synchronization has not yet occurred.

In the up-shift sequence illustrated in FIG. 4C, it is also possible to add an ignition timing retard, which may be activated when the up-shift button is depressed. This ignition timing retard will only be deactivated once the engine is synchronized with the transmission at the end of the up-shifting operation.

Figure 5:
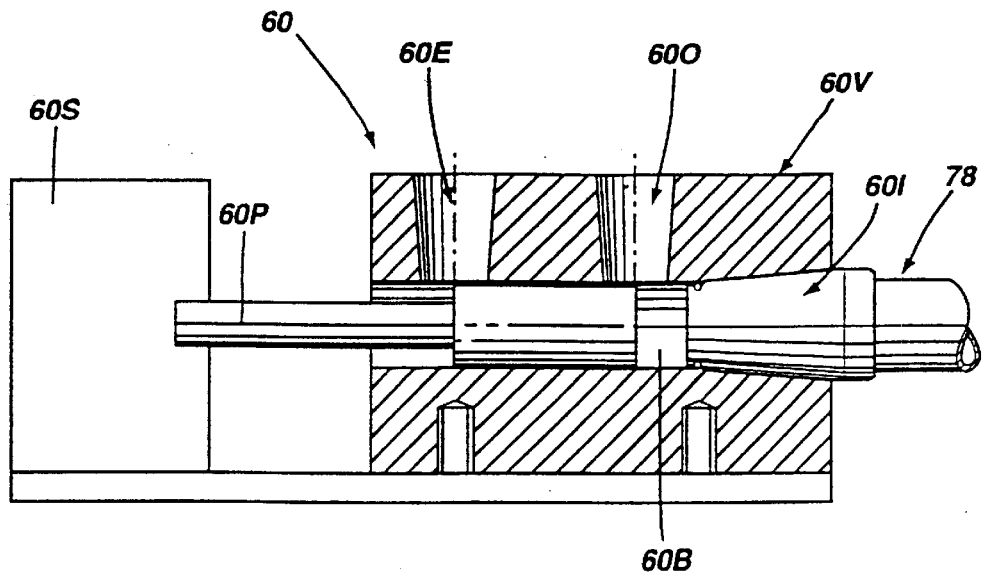
FIG. 5 is an enlarged side elevational view in partial section of a modulated valve-solenoid used in an embodiment of the invention.

As shown in FIG. 5, modulated valve-solenoid 60 includes solenoid 60S and valve 60V. Valve 60V has an inlet port 60I, an outlet port 60O, an extra port 60E and a valve bore 60B. A plunger 60P is thus reciprocal in bore 60B for controlling port 60O. Port 60E prevents any loss or accumulation of fluid in bore 60B.

In operation, solenoid 60S is activated once the up-shifting operation is begun, and plunger 60P prevents any flow of fluid from discharge clutch hose 78 through port 60O while clutch valve-solenoid 58 is deactivated. For allowing a smooth re-engagement between transmission clutch 54 and main shaft 42, the ECU reads inputs N and V for determining the appropriate slippage. For example, the ECU may determine that the engagement of transmission clutch 54 will be accomplished when the rotation speeds of transmission clutch 54 and main shaft 42 are substantially synchronized. Modulated valve-solenoid 60 is then subsequently monitored by the ECU in order to allow a specific pressure decrease rate during discharge. Indeed, instead of controlling solenoid 60S, wherein plunger 60P prevents any flow of fluid, the ECU operates solenoid 60S so that plunger 60P is moved and allows fluid from discharge clutch hose 78 to pass through port 60O. The more important concept is the reduction of current. Lower pressure during discharge results in less slippage.

Down-shifting with the embodiment shown in FIG. 4A is accomplished similarly as up-shifting. In particular, while the operator depresses down-shift button 28, input DO is read by the ECU, an output CS is generated, and clutch valve-solenoid 58 is activated. Clutch valve-solenoid 58 then permits pressurized fluid located in pressurized clutch hose 72 to pass through clutch hose 68 to actuate clutch actuator 56. In so doing, clutch actuator 56 disengages transmission clutch 54 to permit a smooth shift, as described above with respect to the up-shift sequence.

At the same time, output DS is also generated and, after an activating delay, shift valve-solenoid 62 is also activated. Shift valve-solenoid 62 then permits the pressurized fluid located in pressurized shift hose 74 to pass through shift hose 66 for actuating shifting actuator 50. Shifting actuator 50 then operates shift forks 52, which move to engage a lower speed gear. Obviously, down-shifting occurs while transmission clutch 54 is disengaged.

Once down-shifting is complete, transmission clutch 54 must be re-engaged. The ECU thus ceases generation of output CS to deactivate clutch valve-solenoid 58. In doing so, clutch valve-solenoid 58 blocks the pressurized fluid from pressurized clutch hose 72 and permits the fluid to drain from clutch actuator 56 though clutch hose 68, through clutch valve-solenoid 58, through discharge clutch hose 78, and through modulated valve-solenoid 60. The engagement with transmission clutch 54 is then permitted. The ECU allows a smoother down-shift by controlling the duration of slippage between transmission clutch 54 and main shaft 42 via modulated valve-solenoid 60 (either according to a specific duration of time, such as for the up-shift sequence shown in FIG. 4B, or according to V or N, directly or indirectly, such as for the other up-shift sequence shown in FIG. 4C).

It is understood that the ECU used in the semi-automatic transmission system described above may have other inputs provided to it to improve such system. For example, an input T that varies with the position of shift forks 52 may be used. An input ST that varies with the position of the sub-transmission (HI, LO) may be used. An input A that varies with the throttle opening may be used. An input L may also be generated to the ECU. Such input L may be based on input N (a predetermined maximum engine speed) and on input A (a specific throttle opening). Output L may be used by the ECU when the ECU determines that the shifting operation is not appropriate and prevents such shifting operation. Input L may also be used by the ECU wherein the ECU activates a warning light to indicate to the operator that he or she has to up-shift. The ECU may also read the engine speed N when an input UO to DO is generated for determining if clutch valve-solenoid 58 and shift valve-solenoid 62 shall or shall not be activated. Finally, the ECU may also momentarily reduce the engine speed and/or power shifting may occur by altering the ignition timing, cutting the ignition or varying the fuel supply.

Exemplary Embodiments of Automatic Transmission Systems

As discussed previously, either of the embodiments of the transmission 40 shown in FIGS. 3A and 4A are capable of being selectively operated as a semi-automatic or automatic system.

The structure and operation of an automatic system constructed in accordance with an embodiment of the invention is described hereinafter with reference to FIGS. 3A, 6B, 7A, and 7B.

Figure 6B:
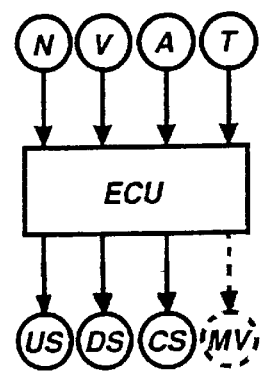
FIG. 6B is a diagrammatic view of a control assembly used in the automatic transmission system.

FIG. 6B illustrates another embodiment of an ECU, which automatically controls CS and SS in the automatic transmission system shown in FIG. 3A. A plurality of electrical signal inputs are provided to the ECU. An input N varies linearly with engine speed (RPM). An input V varies linearly with the vehicle speed. An input T varies with the position of shift forks 52, and an input A varies with the throttle opening.

One or more of the input signals to the ECU is/are used to generate three output signals: an output CS for actuating CS and outputs US and DS for actuating SS. An output IT may also be generated for activating an ignition timing retard, which only becomes deactivated once the engine is substantially synchronized with the transmission at the end of the up-shifting operation.

Once the operator has selected the automatic transmission with mode button 29, the sequence of operation is similar to the operation of the above semi-automatic transmission system constructed in accordance with the embodiment illustrated in FIG. 3A and described above, except that switching mechanism 24 is not required, no inputs UO and DO are generated, and the operator does not control the operation of transmission 40 (shifting sequence may be similar to the one illustrated in FIG. 3B). In fact, the ECU determines the appropriate time for changing the transmission ratio in the automatic mode and the specific shifting operation performed.

When the operator increases the speed of engine 30, centrifugal clutch 38 is engaged automatically as the rotating speed of crankshaft 36 increases, and the output torque of crankshaft 36 is transmitted through centrifugal clutch 38 and transmission clutch 54 to main shaft 42. The torque of main shaft 42 is transmitted through a speed gear and secondary shaft 44 to output shaft 46 to drive output shaft 46.

Figure 7A:
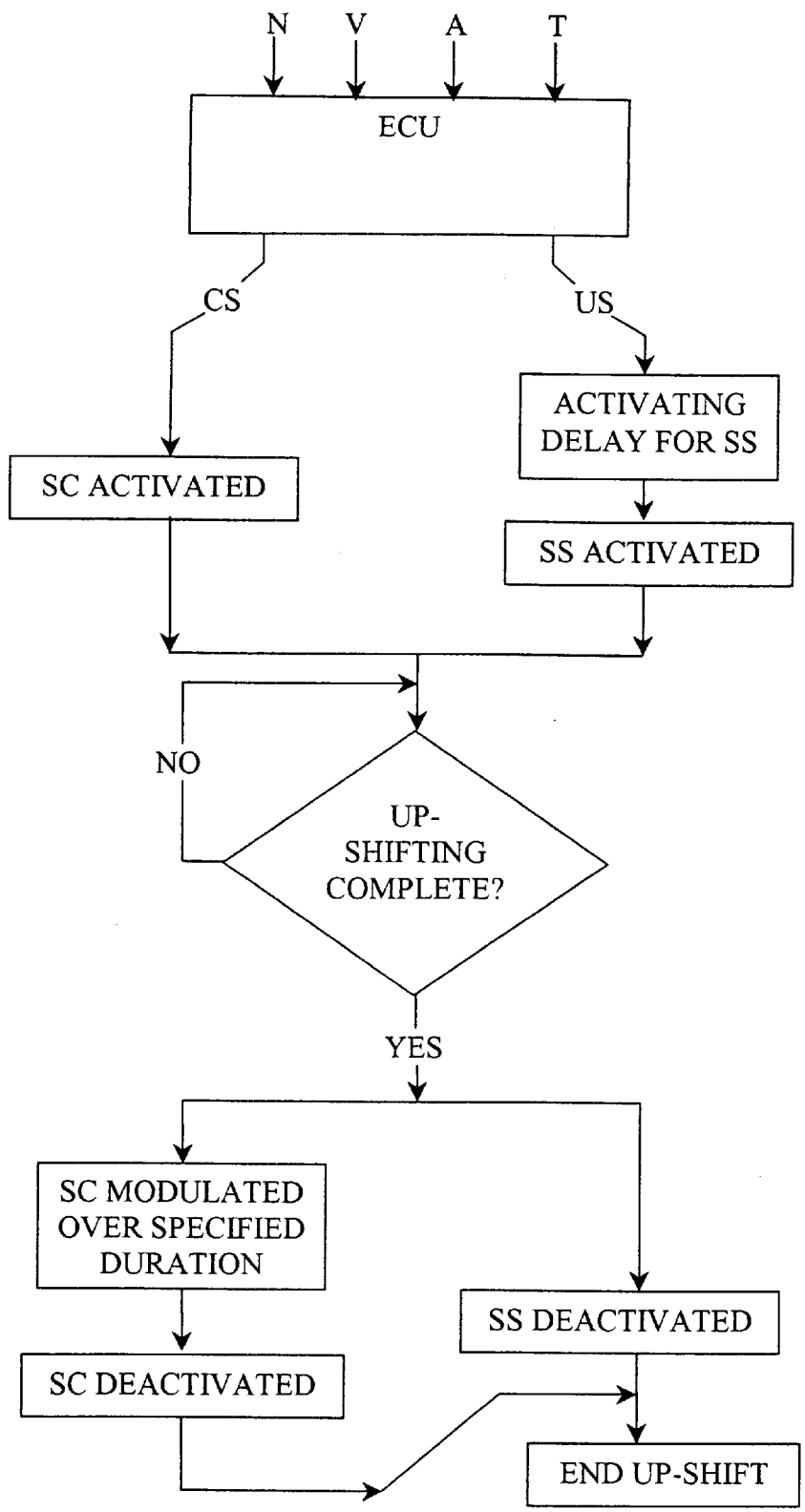
FIG. 7A is a flow chart illustrating an up-shift sequence for an automatic transmission system constructed in accordance with an embodiment of the invention.

According to one exemplary up-shift sequence illustrated in FIG. 7A, once input T indicates transmission 40 is engaged with a speed gear, input N is sampled by the ECU. Once input N indicates engine speed has reached a predetermined engine speed and input A indicates a throttle opening between two predetermined values, then the ECU generates an output CS, and SC is activated to thereby disengage transmission clutch 54 to permit a smooth shift.

At the same time, output US is also generated by the ECU and, after an activating delay, shift valve-solenoid 55 is also activated. Shift valve-solenoid 55 then permits the pressurized fluid located in pressurized shift hose 74 to pass through shift hose 66 for actuating shifting actuator SC. Shifting actuator SC activates shift forks 52, which move in order to engage a consecutively higher speed gear. Obviously, the shifting occurs while transmission clutch 54 is disengaged.

Once shifting is complete, transmission clutch 54 must be re-engaged so that the output torque of crankshaft 36 is transmitted through transmission clutch 54 to main shaft 42 and the torque of main shaft 42 is transmitted through the higher speed gear and secondary shaft 44 to output shaft 46. The ECU controls the re-engagement of the clutch 54 by modulating the SC over a specified duration. SC is then deactivated.

Down-shifting is similarly accomplished. In particular, once input N indicates an engine speed has reached a predetermined engine speed and input A indicates a throttle opening between two predetermined values, the ECU generates an output CS. The CS 58 is activated to disengage the clutch 54. Down-shifting will then occur similarly as the up-shifting operation illustrated in FIG. 7A.

Figure 7B:
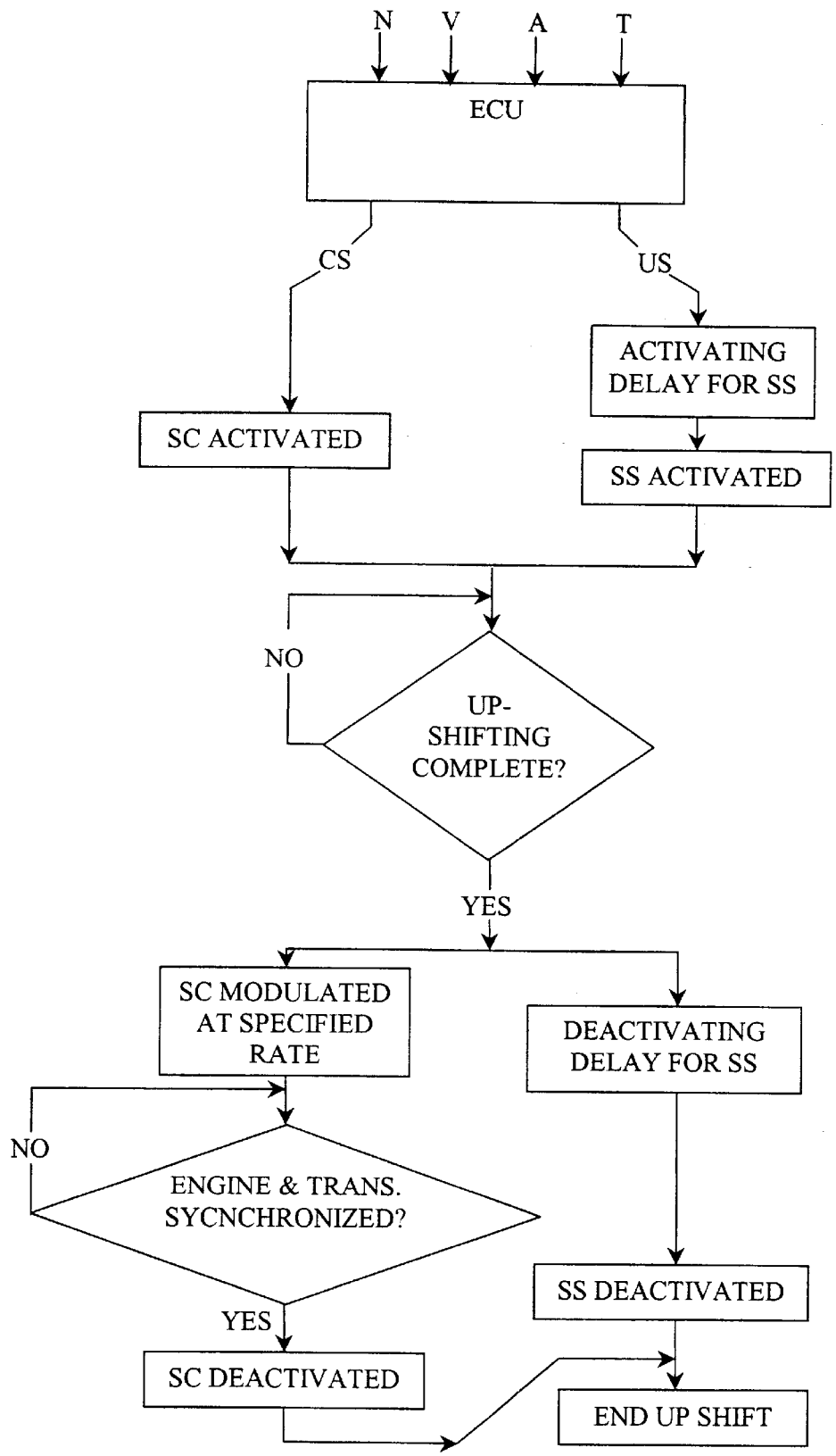
FIG. 7B is a flow chart illustrating an up-shift sequence for an automatic transmission system constructed in accordance with an embodiment of the invention.

Alternatively, the ECU may be configured such that up-shifting is accomplished in a sequence illustrated in FIG. 7B. For this sequence, the ECU monitors the engine and vehicle speed N and V, so that upon re-engagement of the clutch 54, the ECU may control the engagement until the engine and transmission are substantially synchronized.

It is understood that the ECU used in the automatic transmission system described above may have other inputs provided to it to improve such system. For example, an input ST that varies with the position of the sub-transmission (HI, LO) may be used. An input L may also be generated to the ECU, such input L may be based on input N (a predetermined maximum engine speed) and on input A (a specific throttle opening). Such output L may be used by the ECU to activate CS and SS for up-shifting to the next speed gear.

The structure and operation of an automatic system constructed in accordance with another embodiment of the invention is described hereinafter with reference to FIGS. 4A, 6B, 7C, and 7D.

Referring to FIG. 6B, one or more of the input signals to the ECU is/are used to generate four output signals: an output CS for actuating clutch solenoid 58, outputs US and DS for actuating shift solenoid 62 and an output MV for controlling modulated valve-solenoid 60. An output IT may also be generated for activating an ignition timing retard, which only becomes deactivated once the engine is synchronized with the transmission at the end of the up-shifting operation.

Once the operator has selected the automatic transmission with mode button 29, the sequence of operation is similar to the operation of the above semi-automatic transmission system constructed in accordance with the embodiment illustrated in FIG. 4A and described above, except that switching mechanism 24 is not required, no inputs UO and DO are generated, and the operator does not control the operation of transmission 40 (shifting sequence may be similar to the one illustrated in FIG. 4B or 4C). In fact, the ECU determines the appropriate time for changing the transmission ratio in the automatic mode.

When the operator increases the speed of engine 30, centrifugal clutch 38 is engaged automatically as the rotating speed of crankshaft 36 increases, and the output torque of crankshaft 36 is transmitted through centrifugal clutch 38 and transmission clutch 54 to main shaft 42. The torque of main shaft 42 is transmitted through a speed gear and secondary shaft 44 to output shaft 46 to drive output shaft 46.

Figure 7C:
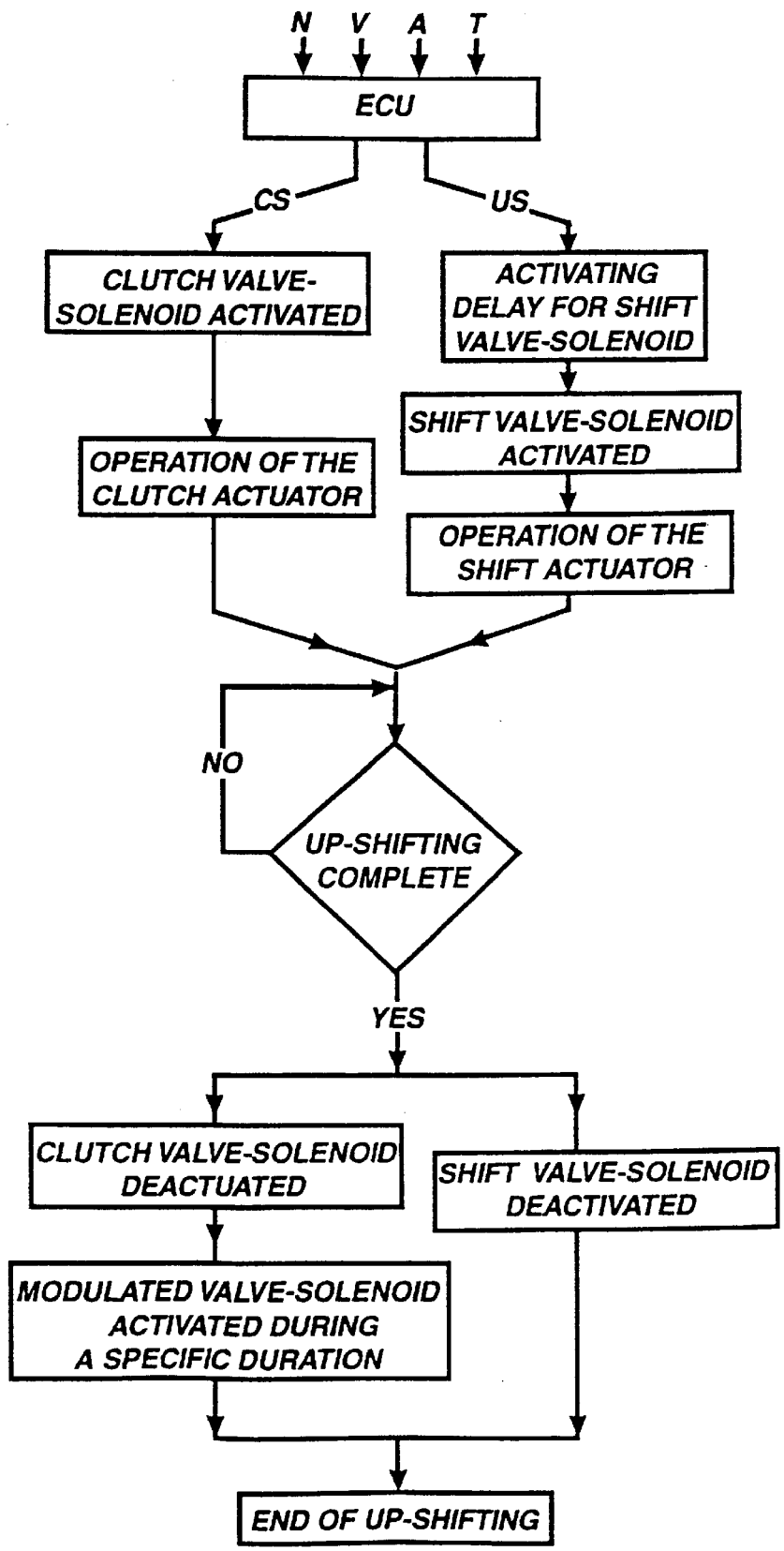
FIG. 7C is a flow chart illustrating an up-shift sequence for an automatic transmission system constructed in accordance with an embodiment of the invention.

According to an up-shift sequence illustrated in FIG. 7C, once input T indicates transmission 40 is engaged with a speed gear, input N is sampled by the ECU. Input N indicates engine speed has reached a predetermined engine speed and input A indicates a throttle opening between two predetermined values. Then, the ECU generates an output CS, and clutch valve-solenoid 58 is activated.

Clutch valve-solenoid 58 then permits pressurized fluid located in pressurized clutch hose 72 to pass through clutch hose 68 for actuating clutch actuator 56. In so doing, clutch actuator 56 disengages transmission clutch 54 to permit a smooth shift.

At the same time, output US is also generated by the ECU and, after an activating delay, shift valve-solenoid 62 is also activated. Shift valve-solenoid 62 then permits the pressurized fluid located in pressurized shift hose 74 to pass through shift hose 66 for actuating shifting actuator 50. Shifting actuator 50 activates shift forks 52, which move in order to engage a consecutively higher speed gear. Obviously, the shifting occurs while transmission clutch 54 is disengaged.

Once shifting is complete, transmission clutch 54 must be re-engaged so that the output torque of crankshaft 36 is transmitted through transmission clutch 54 to main shaft 42 and the torque of main shaft 42 is transmitted through the higher speed gear and secondary shaft 44 to output shaft 46.

Thus, the ECU ceases generation of output CS to deactivate clutch valve-solenoid 58. In doing so, clutch valve-solenoid 58 blocks the pressurized fluid from pressurized clutch hose 72 and permits the fluid to drain from clutch actuator 56 through clutch hose 68, through clutch valve-solenoid 58, through discharge clutch hose 78 and through modulated valve-solenoid 60. Engagement of transmission clutch 54 is then permitted. However, to permit a smooth engagement between transmission clutch 54 and main shaft 42, a certain amount of slippage is permitted during such engagement.

As with the embodiment described above and shown in FIG. 3A, the amount of slippage may be controlled by the ECU. With the embodiment shown in FIG. 4A, however, the modulated valve-solenoid 60 is controlled by the ECU to gradually (relatively, at a predetermined rate) decrease the pressure within the clutch actuator 56 to correspondingly gradually re-engage the plates 54b, 54c of the clutch 54.

Figure 7D:
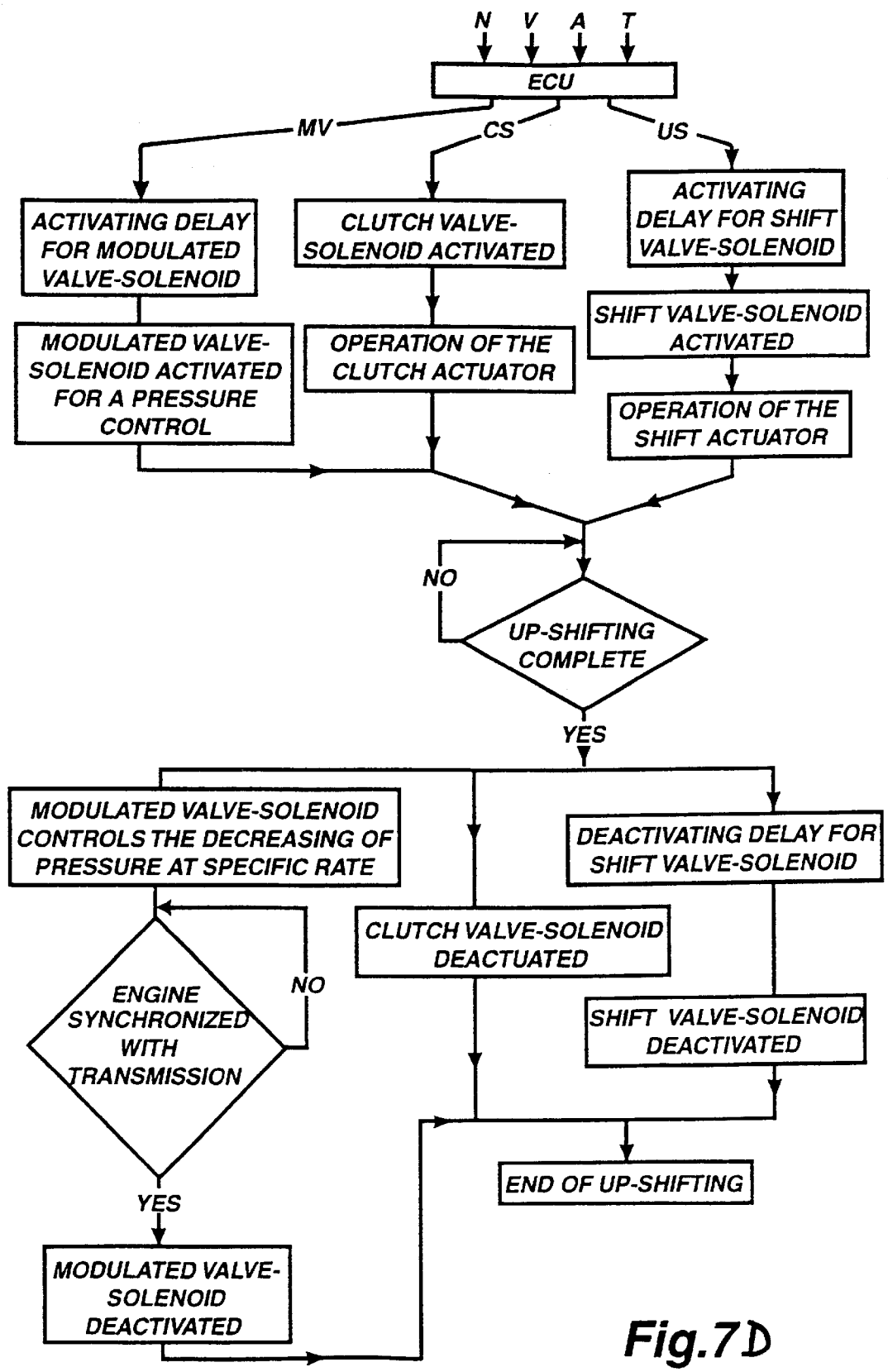
FIG. 7D is a flow chart illustrating an up-shift sequence for an automatic transmission system constructed in accordance with an embodiment of the invention.

In the up-shift sequence illustrated in FIG. 7C, modulated valve-solenoid 60 is modulated over a predetermined duration of time to introduce slippage for that duration. Alternatively, the ECU may base the re-engagement of clutch 54 on the synchronization of the engine with the transmission, such as illustrated in FIG. 7D. The up-shift sequence of FIG. 7D is similar to the one illustrated in FIG. 7C, but modulated valve-solenoid 60 is here activated for a pressure control determined by the ECU based on engine speed and vehicle speed (directly or indirectly). Modulated valve-solenoid 60 is thus activated after a short specific period of time so that plunger 60P prevents any flow of fluid from discharge clutch hose 78 through port 60O for creating such pressure control. Afterwards, modulated valve-solenoid 60 will control the pressure of fluid in clutch actuator 56 for monitoring the amount of slippage during the engagement between transmission clutch 54 and main shaft 42. A deactivating delay is also added for controlling the termination of operation of shift valve-solenoid 62.

Hence, in the up-shift sequence illustrated in FIG. 7D, instead of monitoring modulated valve-solenoid 60 according to a specific duration of time as illustrated in FIG. 7C, the ECU monitors modulated valve-solenoid 60 in accordance with V and N. Modulated valve-solenoid 60 thus controls the pressure of fluid in clutch actuator 56, which decreases at a specific rate as long as the rotation speeds of transmission clutch 54 and main shaft 42 are not substantially synchronized. Once synchronization occurs, modulated valve-solenoid 60 is deactivated. For this sequence, the ECU monitors the engine and vehicle speed N and V, so that upon re-engagement of the clutch 54, the ECU may control the engagement until the engine and transmission are substantially synchronized.

Down-shifting is similarly accomplished. In particular, once input N indicates an engine speed has reached a predetermined engine speed and input A indicates a throttle opening between two predetermined values, the ECU generates an output CS. The clutch valve-solenoid 58 is activated. Down-shifting will then occur in a respective similar manner as that illustrated in FIGS. 7C and 7D.

It is understood that the ECU used in the automatic transmission system described above may have other inputs provided to it to improve such system. For example, an input ST that varies with the position of the sub-transmission (HI, LO) may be used. An input L may also be generated to the ECU, such input L may based on input N (predetermined maximum engine speed) and on input A (a specific throttle opening). Such output L may be used by the ECU to activate clutch valve-solenoid 58 and shift valve-solenoid 62 for up-shifting to the next speed gear.

In either of the embodiments shown in FIGS. 3A and 4A relating to automatic transmissions, shifting may be controlled based on a series of predetermined and preprogrammed values. With the system in the automatic mode, the ECU controls the gear change based on two basic variables: input A, which represents the throttle position sensor (TPS) signal that measures the degree to which the plate in the carburetor is open; and input N, which represents the engine speed (RPM). It is noted that N may directly represent engine speed (such as in RPM), but also may be an indirect or other direct representative of engine speed, which may be used to derive the engine speed. In accordance with this invention, gear shifting is performed according to a table of values that are preprogrammed or hard-wired into the ECU. By using preselected, preprogrammed values, the vehicle will shift gears in the same way each time the same engine variables are encountered.

In this example, the vehicle has two sets of gears: a high (HI) set of gears and a low (LO) set of gears, that enable the vehicle to shift through a wider range of gear ratios. The values used by the ECU for shifting are stored in a look-up table in the read only memory (ROM) portion of the ECU. Of course, any conventional storage medium may be used, including replaceable storage disks if desired, or any other storage medium in communication with the ECU.

It is contemplated that look-up tables corresponding to the embodiment of the invention utilizing SC and SS may contain values used to directly or indirectly determine activation and deactivation of SC and SS to affect shifting of the transmission. Accordingly, the look-up tables facilitate shifting and allow for various degrees of slippage in the clutch 54 corresponding to parameters such as engine speed (directly or indirectly) and throttle position.

Additionally, it is contemplated that the look-up tables corresponding to the embodiment of the invention utilizing the modulated valve-solenoid 60 may be used to control the actuation of the shift valve-solenoid 62, clutch valve-solenoid 58, and the modulated valve-solenoid 60. For example, a portion of a sample table is reproduced below in Tables 1A and 1B showing up-shift values in RPMs for the HI set and in Tables 2A and 2B showing up-shift values in RPMs for the LO set. As seen, Tables 1B and 2B are continuations of Tables 1A and 2A, respectively. Tables 3A and 3B (which is a continuation of Table 3A) show downshift values for the HI set, and Tables 4A and 4B (which is a continuation of Table 4A) show downshift values for the LO set.

TABLE 1A

| GEAR/<br>TPS (DEG) | 0 | 4 | 8 | 12 | 16 | 20 | 24 | 28 | 32 | 36 | 40 |
|---|---|---|---|---|---|---|---|---|---|---|---|
| 1–2 | 6000 | 5000 | 4500 | 4500 | 4500 | 4500 | 4500 | 4500 | 4500 | 4500 | 4500 |
| 2–3 | 6000 | 5000 | 4800 | 4500 | 4500 | 4500 | 4500 | 4600 | 4800 | 5000 | 5300 |
| 3–4 | 6000 | 5000 | 4800 | 4800 | 4800 | 4800 | 4800 | 4900 | 5160 | 5400 | 5500 |
| 4–5 | 6000 | 5000 | 5000 | 5000 | 5000 | 5000 | 5000 | 5100 | 5400 | 5600 | 5700 |

TABLE 1B

| GEAR/<br>TPS (DEG) | 44 | 48 | 52 | 56 | 60 | 64 | 68 | 72 | 76 | 80 | 84 |
|---|---|---|---|---|---|---|---|---|---|---|---|
| 1–2 | 4800 | 5000 | 5300 | 5800 | 6000 | 6200 | 6400 | 6700 | 7500 | 7500 | 7000 |
| 2–3 | 5500 | 5700 | 5900 | 6100 | 6300 | 6500 | 6700 | 7000 | 7500 | 7500 | 7200 |
| 3–4 | 5700 | 5900 | 6100 | 6300 | 6500 | 6700 | 6800 | 7000 | 7200 | 7200 | 7200 |
| 4–5 | 5900 | 6100 | 6300 | 6500 | 6700 | 6800 | 7000 | 7000 | 7000 | 7000 | 7000 |

TABLE 2A

| GEAR/<br>TPS (DEG) | 0 | 4 | 8 | 12 | 16 | 20 | 24 | 28 | 32 | 36 | 40 |
|---|---|---|---|---|---|---|---|---|---|---|---|
| 1–2 | 6000 | 5000 | 4300 | 4100 | 4100 | 4100 | 4100 | 4100 | 4100 | 4200 | 4300 |
| 2–3 | 6000 | 5000 | 4800 | 4500 | 4500 | 4500 | 4500 | 4600 | 4800 | 5000 | 5200 |
| 3–4 | 6000 | 5000 | 4800 | 4800 | 4800 | 4800 | 4800 | 4900 | 5160 | 5400 | 5500 |
| 4–5 | 6000 | 5000 | 5000 | 5000 | 5000 | 5000 | 5000 | 5100 | 5400 | 5600 | 5700 |

TABLE 2B

| GEAR/<br>TPS (DEG) | 44 | 48 | 52 | 56 | 60 | 64 | 68 | 72 | 76 | 80 | 84 |
|---|---|---|---|---|---|---|---|---|---|---|---|
| 1–2 | 4500 | 4800 | 5000 | 5200 | 5400 | 5600 | 5800 | 6000 | 7200 | 7200 | 6500 |
| 2–3 | 5400 | 5600 | 5700 | 5900 | 6100 | 6300 | 6500 | 6700 | 7500 | 7500 | 6800 |
| 3–4 | 5700 | 5900 | 6100 | 6300 | 6500 | 6700 | 6800 | 7000 | 7500 | 7500 | 7000 |
| 4–5 | 5900 | 6120 | 6300 | 6500 | 6700 | 6800 | 7000 | 7000 | 7200 | 7200 | 7000 |

TABLE 3A

| GEAR/<br>TPS (DEG) | 0 | 4 | 8 | 12 | 16 | 20 | 24 | 28 | 32 | 36 | 40 |
|---|---|---|---|---|---|---|---|---|---|---|---|
| 2–1 | 1800 | 1800 | 1800 | 1800 | 1800 | 1800 | 1900 | 2000 | 2200 | 2400 | 2600 |
| 3–2 | 2000 | 2000 | 2000 | 2000 | 2000 | 2100 | 2200 | 2200 | 2400 | 2600 | 2800 |
| 4–3 | 2500 | 2500 | 2500 | 2500 | 2500 | 2500 | 2500 | 2500 | 2700 | 2700 | 2900 |
| 5–4 | 3000 | 3000 | 3000 | 3000 | 3000 | 3000 | 3000 | 3000 | 3000 | 3000 | 3000 |

TABLE 3B

| GEAR/<br>TPS (DEG) | 44 | 48 | 52 | 56 | 60 | 64 | 68 | 72 | 76 | 80 | 84 |
|---|---|---|---|---|---|---|---|---|---|---|---|
| 2–1 | 2800 | 3000 | 3200 | 3200 | 3300 | 3400 | 3400 | 3600 | 3600 | 3600 | 3600 |
| 3–2 | 3000 | 3200 | 3400 | 3400 | 3500 | 3600 | 3800 | 3900 | 4100 | 4100 | 4100 |
| 4–3 | 3100 | 3300 | 3500 | 3600 | 3800 | 3800 | 4000 | 4200 | 4500 | 4500 | 4500 |
| 5–4 | 3200 | 3400 | 3600 | 3700 | 4000 | 4000 | 4200 | 4500 | 4800 | 4800 | 4800 |

TABLE 4A

| GEAR/<br>TPS (DEG) | 0 | 4 | 8 | 12 | 16 | 20 | 24 | 28 | 32 | 36 | 40 |
|---|---|---|---|---|---|---|---|---|---|---|---|
| 2–1 | 1500 | 1500 | 1500 | 1500 | 1600 | 1700 | 1800 | 2000 | 2200 | 2400 | 2600 |
| 3–2 | 1800 | 1800 | 1800 | 1800 | 1800 | 1900 | 2000 | 2200 | 2400 | 2600 | 2800 |
| 4–3 | 2500 | 2500 | 2500 | 2500 | 2500 | 2500 | 2500 | 2500 | 2700 | 2700 | 2900 |
| 5–4 | 3000 | 3000 | 3000 | 3000 | 3000 | 3000 | 3000 | 3000 | 3000 | 3000 | 3000 |

TABLE 4B

| GEAR/<br>TPS (DEG) | 44 | 48 | 52 | 56 | 60 | 64 | 68 | 72 | 76 | 80 | 84 |
|---|---|---|---|---|---|---|---|---|---|---|---|
| 2–1 | 2800 | 3000 | 3200 | 3200 | 3300 | 3400 | 3400 | 3600 | 3600 | 3600 | 3600 |
| 3–2 | 3000 | 3200 | 3400 | 3400 | 3500 | 3600 | 3800 | 3800 | 3900 | 4000 | 4000 |
| 4–3 | 3100 | 3300 | 3500 | 3600 | 3800 | 3800 | 3800 | 4000 | 4100 | 4300 | 4500 |
| 5–4 | 3200 | 3400 | 3600 | 3800 | 4000 | 4000 | 4000 | 4200 | 4500 | 4800 | 4800 |

Referring to the above Tables, for example Table 1A, in the automatic mode, the ECU effects a gear change from first to second gear (1–2) when the throttle position sensor (TPS) has been displaced 8 degrees from the 0 or closed position and the engine speed reaches 4500 RPM. A change from third to fourth gear (3–4) is effected when the TPS is 12 degrees and the engine speed is 4800 RPM. Downshifting occurs in the same manner based on the look-up tables shown in Tables 3A–3B and 4A–4B. It is noted that shifting occurs for a particular TPS range and at specific RPM values and, accordingly, the RPM values as listed in the Tables do not necessarily correspond to an instantaneous TPS value.

The above Tables show a displacement up to 84 degrees. The TPS may be displaced more than 84 degrees, but the RPM values do not change beyond that point in the preferred embodiment, although in alternative embodiments these could be changed beyond 84 degrees. At any TPS of 84 degrees or more, shifting will occur at the same engine speed (at 7000 RPM to up-shift from 1–2, for example.)

This assembly includes a safety feature that prevents up-shifting at 0 TPS below 6000 RPM. The 6000 RPM value is an arbitrarily high value, which of course could be adjusted, that the engine cannot reach when the throttle is closed (0 TPS). Thus, if no throttle is given to the engine, shifting is not possible.

Also according to this invention, a plurality of different tables are provided for each shifting sequence or mode so that the shifting parameters may be changed based on an operator's driving preference. This allows the operator to adjust the aggressiveness of the shifting operation. In a preferred embodiment, seven different tables are provided including a standard value table and three up-shift and three downshift alternatives to provide seven different shifting modes. The table of parameters that control each shifting mode are all preprogrammed into the ECU or to a device in communication with the ECU. The tables are preferably altered in each mode so that the gear shift occurs at 250 RPM more or less than the previous mode. Of course, these parameters may vary. The number of different shifting modes may also be varied and are not limited to or required to be seven modes.

The selection of the different shifting modes is effected by operating the shift lever, in this case switching mechanism 24 with up-shift button switch 26 and downshift button switch 28. For example, the up-shift button may be toggled once for the first up-shift table, twice for the next up-shift table and so on. A default setting may be established whereby the ECU automatically goes to a particular table upon starting the engine. A preferred default setting would be the standard table, thereby allowing each operator to alter the shifting mode based on the operator's individual preference for a more or less aggressive transmission.

As described previously, in order to provide smooth shifting, the ECU modulates the clutch 54 to reduce shift shock (i.e., the ECU controls the modulation of the modulated valve-solenoid). The modulation may be governed by a series of preprogrammed look-up tables. The tables include values used by the ECU for providing a measure of slippage by the clutch 54 and are stored in a look-up table in the read only memory (ROM) portion of the ECU. Of course, any conventional storage medium may be used, including replaceable storage disks if desired, or any other storage medium in communication with the ECU.

Tables 5A, 5B, 6A, and 6B, below, each include information needed to control modulated valve-solenoid 60. Specifically, the numbers in the Tables represent an amount of current applied to a coil of modulated valve-solenoid 60. The higher the number shown in the Tables for each gear change, the greater the amount of current that is applied to the modulated valve-solenoid 60, which translates to a greater pressure applied by modulated valve-solenoid 60. In this regard, a greater pressure applied by modulated valve-solenoid 60 results in a greater slippage of clutch 54 (as discussed above with reference to FIG. 5). Conversely, a smaller pressure results in a smaller amount of slippage. When the slippage is small, clutch 54 engages much more quickly than when there is a greater amount of slippage. As discussed previously, values within the Tables may be modified to represent input voltages applied to SC and SS to produce slippage.

Portions of sample look-up tables are reproduced below. Table 5A shows the fractional amount of current applied to the modulated valve-solenoid 60 and the timing values for the throttle position switch (TPS) at full or wide open throttle (WOT) and idle during up-shift in HI gears. Table 5B corresponds to up-shifting in LO gears. Table 6A corresponds to down-shifting in HI gears, and Table 6B corresponds to down-shifting in LO gears. For each of the examples shown in Tables 5A, 5B, 6A, and 6B, the TPS Regulation Sampling Period is 5 msec, the TPS Regulation Filter is 1, and the TPS WOT is 60, which are described in detail below. It is noted that the TPS Regulation Sampling Period represents the length of the sampling window, while the TPS Regulation Filter represents the number of samples taken during that sampling window. Accordingly, the sensitivity of the TPS may be adjusted by correspondingly changing the TPS Regulation Sampling Period and Filter. (It is noted that a highest sensitivity is attained for a relative low TPS Regulation Sampling Period value and a relatively high TPS Regulation Filter value.) In the examples shown below, RPM 1=1700 RPM, RPM 2=2500 RPM, RPM 3=3750 RPM, RPM 4=5000 RPM, and RPM 5=6250 RPM. Of course, the RPM levels 1–5 could be set at any desired RPM value.

the engine speed is greater than 1700 RPM (but below 2500 RPM) to shift from gear 4 to gear 5.

To control the timing of the pressure change in modulated valve-solenoid 60 so that there are no sudden transitions between gears (which results in poor ride quality), the current applied to modulated valve-solenoid 60 is decreased from its percentage amount to 0 according to the values provided in the last three columns in Table 5A. The "By mSec WOT TPS" column includes timing values that are applied when the throttle position sensor (TPS) is in the full throttle position, or WOT. WOT does not mean that the throttle is fully opened but, rather, WOT refers to the throttle

TABLE 5A

| GEAR | RPM 1 | RPM 2 | RPM 3 | RPM 4 | RPM 5 | DECREASE (%) | By mSec WOT TPS | By mSec Idle TPS |
|---|---|---|---|---|---|---|---|---|
| 1–2 | 36.0 | 35.0 | 33.0 | 30.0 | 25.0 | 1.5 | 10 | 199 |
| 2–3 | 33.0 | 32.0 | 30.0 | 28.0 | 23.0 | 1.5 | 5 | 102 |
| 3–4 | 30.0 | 28.0 | 26.0 | 24.0 | 20.0 | 1.5 | 5 | 54 |
| 4–5 | 25.0 | 23.0 | 22.0 | 20.0 | 17.0 | 1.5 | 5 | 32 |

TABLE 5B

| GEAR | RPM 1 | RPM 2 | RPM3 | RPM 4 | RPM 5 | DECREASE (%) | By mSec WOT TPS | By mSec Idle TPS |
|---|---|---|---|---|---|---|---|---|
| 1–2 | 36.0 | 35.0 | 34.0 | 33.0 | 30.0 | 1.0 | 48 | 248 |
| 2–3 | 33.0 | 32.0 | 31.0 | 30.0 | 27.0 | 1.0 | 32 | 167 |
| 3–4 | 31.0 | 30.0 | 28.0 | 29.0 | 26.0 | 1.0 | 21 | 86 |
| 4–5 | 29.0 | 28.0 | 26.0 | 25.0 | 22.0 | 1.0 | 16 | 75 |

TABLE 6A

| GEAR | RPM 1 | RPM 2 | RPM 3 | RPM 4 | RPM 5 | DECREASE (%) | By mSec WOT TPS | By mSec Idle TPS |
|---|---|---|---|---|---|---|---|---|
| 2-1 | 35.0 | 36.0 | 35.0 | 34.0 | 33.0 | 0.5 | 27 | 199 |
| 3-2 | 33.0 | 34.0 | 33.0 | 32.0 | 30.0 | 0.5 | 10 | 124 |
| 4-3 | 31.0 | 32.0 | 31.0 | 30.0 | 28.0 | 1.0 | 10 | 75 |
| 5-4 | 28.0 | 30.0 | 28.0 | 27.0 | 26.0 | 1.0 | 5 | 32 |

TABLE 6B

| GEAR | RPM 1 | RPM 2 | RPM 3 | RPM 4 | RPM 5 | DECREASE (%) | By mSec WOT TPS | By mSec Idle TPS |
|---|---|---|---|---|---|---|---|---|
| 2-1 | 35.0 | 36.0 | 35.0 | 35.0 | 35.0 | 0.5 | 32 | 248 |
| 3-2 | 34.0 | 35.0 | 34.0 | 33.0 | 32.0 | 0.5 | 21 | 178 |
| 4-3 | 32.0 | 34.0 | 33.0 | 30.0 | 29.0 | 1.0 | 21 | 124 |
| 5-4 | 29.0 | 31.0 | 30.0 | 29.0 | 28.0 | 1.5 | 10 | 75 |

Referring to Table 5A, for example, when up-shifting from gear 4 to gear 5, if the engine speed is at RPM 1, then the current applied to modulated valve-solenoid 60 will be 25.0%, which is a value associated with the actual current applied. The value 25.0% refers to the fractional amount of current applied to modulated valve-solenoid 60 between 0.0%, where modulated valve-solenoid 60 applies no pressure to clutch 54, and 100.0%, where modulated valve-solenoid 60 applies the maximum amount of pressure. RPM 1 refers to the lowest motor speed, in this case 1700 RPM. In practice, when the engine is experiencing a motor speed of RPM 1, this means that the engine speed is above 1700 RPM but below 2500 RPM (RPM 2). Accordingly, a 25.0% current will be applied to modulated valve-solenoid 60 when position where the maximum engine speed is achieved. In Table 5A, therefore, TPS WOT refers to the wide-open throttle position, which is 60 degrees in this case. The final column in Table 5A is "By mSec Idle TPS", which refers to the idle throttle position sensed by the system. This may refer to a 0 degree throttle position or some other nominal throttle amount to permit the engine to idle.

So, where the TPS is in the WOT condition, after the gears have been changed from $4^{th}$ to $5^{th}$, the current applied to modulated valve-solenoid 60 is decreased from 25.0% to 0% in 1.5% increments every 5 msec. In other words, to change from gear 4 to 5, a 25.0% current is applied to modulated valve-solenoid 60. Five milliseconds after the gear change, the pressure in modulated valve-solenoid 60 is decreased 1.5% so that the pressure is 23.5% (=25.0−1.5%). Five milliseconds after that, the current applied to modulated valve-solenoid 60 is decreased another 1.5%. This decrease continues at 1.5% per every 5 msec until the current is reduced to 0 (or until modulation has ceased, as discussed above) and the clutch re-engages. In this case, then, it takes about 80 msec for the pressure in modulated valve-solenoid 60 to reduce to 0 before the clutch re-engages. This results in a rapid decrease so that the gear change is very quick.

Conversely, when the TPS is sensed in the idle position, for a change from $4^{th}$ to $5^{th}$ gear, the current is decreased in 1.5% increments every 32 msec. For the idle TPS, the time interval is longer to present the driver with a longer decrease in modulated valve-solenoid current. This is preferred because it creates a pressure decrease over a longer period of time so that the clutch engages at a slower rate than in the WOT condition. This arrangement is preferred when the TPS is at idle, since the engine 30 produces only a limited amount of power at this speed. Conversely, when the TPS is in the WOT position, the engine 30 produces a significant amount of power and may therefore, support a rapid engagement of the clutch 54. Also, the rapid engagement of the clutch 54 prevents the engine 30 from rapidly increasing in speed due to a lack of load thereon.

Additionally, when the TPS lies between the WOT and idle conditions for a change in gears, the system interpolates a time interval that falls between the time interval for the WOT condition and the idle condition. For example, if the TPS were at 50% of the value between the WOT condition and the idle condition (which, for Table 5A, would be 30 degrees), the system will calculate a time interval of, for example, 13.5 msec, which is appropriate for that TPS. The interval, of course, lies between the 5 msec minimum for the WOT condition and the 32 msec interval for the idle condition. The actual value of the time interval is determined by an extrapolation curve that is incorporated into the system programming.

The "TPS Regulation Filter" value that corresponds to Table 5A refers to a filter sampling feature that is incorporated into the automatic operation of the transmission system. The filter sampling feature prevents unwanted shifting of the gears in transition periods during the operation of the ATV automatic transmission. The sampling filter smoothes the TPS values during operation of the transmission system so that an instantaneous TPS value is not relied upon for purposes of up-shift or down-shift (Tables 1–4).

When the transmission changes gears from one to another, the engine speed adjusts over a period of time from a higher speed to a lower speed. However, this creates a potential situation where the transmission system may try to up-shift repeatedly in a short period of time.

For example, after the operator up-shifts from $1^{st}$ to $2^{nd}$ gear, the engine will adjust to a new engine speed. However, if the operator releases the throttle so that the TPS returns to a low value (such as 12 degrees), the transmission system (if it did not have the filter) would then operate according to the parameters shown in Table 1A and 2A. If the engine speed were 4500 RPM or higher and the TPS were at 12 degrees, the transmission system would take those instantaneous values and decide to up-shift from $2^{nd}$ to $3^{rd}$ gear immediately after shifting from $1^{st}$ to $2^{nd}$ gear. In other words, if the operator releases the throttle after up-shifting, the parameters of the engine might be such that the transmission system would sense conditions requiring a subsequent (but unnecessary) second up-shift. The sampling filter prevents this type of operation because it interpolates the TPS for a period of time so that the instantaneous value for the TPS is not the value used for the up-shift or down-shift tables (Tables 1–4). In this manner, the transmission system may automatically compensate by utilizing a certain number of consecutive TPS values, which number may be selectively variable by the rider, effectively ignoring the instantaneous TPS value. This avoids the situation where the transmission may make an unnecessary up-shift or down-shift.

Additionally, it may be preferable for the "TPS Regulation Filter" to be more sensitive in up-shift situations than in down-shift situations. In other words, it may be preferable for the system to be more responsive to rider input upon acceleration (coinciding with up-shifting) than during deceleration (coinciding with down-shifting), such that the transmission up-shifts immediately upon satisfying the conditions set forth with the look-up tables described above (for this level of sensitivity, the ECU may base up-shifting on instantaneous TPS values, or the TPS Regulation Filter may perform only relatively low order filtering, with relatively few samples taken), while the transmission down-shifts only when a selected number of consecutive, averaged samples satisfy the conditions set forth in the look-up tables (for this lower level of sensitivity, the TPS Regulation Filter may require a relatively large number of samples be determine appropriate down-shifting times). In this manner, the system may be very sensitive to up-shifting, while the system is more resistive to down-shifting to thereby limit the likelihood of unnecessary or undesirable down-shifting. To accomplish this selective sensitivity feature, the TPS Regulation Filter may be provided with a capability to adjust filtering between an up-shifting responsive (high sensitivity) level and a down-shifting conservative (low sensitivity) level. Furthermore, it is contemplated that the relative magnitudes for the responsive and conservative levels of filtering may be selectable by the rider or ECU.

The operation of the remaining tables 5B, 6A, and 6B is the same as that described for Table 5A.

Modulation Self-Calibration

It may be preferable to provide the ECU with the capability of calibrating the modulation duration to maintain a smooth clutch engagement for the various levels of aggressiveness.

As described above, the ECU controls the slippage allowed within the clutch 54 by varying the current delivered to the modulated valve-solenoid 60. Accordingly, the modulated valve-solenoid 60 "modulates" the clutch 54 depending on the current delivered thereto. For the embodiment of the modulated valve-solenoid 60 described herein, a higher current delivered to the modulated valve-solenoid 60 corresponds to a longer slippage duration (since the amount of fluid allowed to exit the modulated valve-solenoid 60 decreases as the current delivered to the modulated valve-solenoid 60 increases). Furthermore, Tables 5A–6B show values representative of corresponding current levels delivered to the modulated valve-solenoid 60 for corresponding shifting operations and RPM values.

For calibration, the ECU monitors the slippage duration upon shifting and compares that value with upper and lower bounds stored in a look-up table. Tables 7A and 7B show examples of various upper and lower slippage duration bounds for the particular shifting operation and RPM range during that shifting operation. Table 7A represents example upper and lower bounds for when the transmission is in the semi-automatic mode. Table 7B represents example upper and lower bounds for when the transmission is in the automatic mode and optionally stores TPS ranges, as well.

TABLE 7A

| | RPM RANGE | | SLIP DURATION (ms) | |
|---|---|---|---|---|
| GEAR | MIN | MAX | MIN | MAX |
| 2-1 | 1600 | 2000 | 199 | 399 |
| 3-2 | 1900 | 2300 | 172 | 345 |
| 4-3 | 2300 | 2700 | 156 | 313 |
| 5-4 | 2800 | 3200 | 135 | 270 |

TABLE 7B

| | RPM RANGE | | SLIP DURATION (ms) | | TPS RANGE | |
|---|---|---|---|---|---|---|
| GEAR | MIN | MAX | MIN | MAX | MIN | MAX |
| 2-1 | 1600 | 2000 | 291 | 453 | 0 | 8 |
| 3-2 | 1900 | 2300 | 253 | 383 | | |
| 4-3 | 2300 | 2700 | 232 | 345 | | |
| 5-4 | 2800 | 3200 | 205 | 307 | | |

The ECU is operable to adjust the modulation values (current delivered to the modulation valve-solenoid 60) given in the Tables 5A–6B. If, for a particular RPM range, the ECU detects a slippage duration within the range given in the corresponding table (Table 7A or 7B) for the corresponding gear shifting operation, then the ECU makes no changes. However, if a slippage duration is detected that is outside the range (i.e., the ECU detects a slippage duration that is either longer than the max, or upper bound, slip duration or shorter than the min, or lower bound, slip duration) given in the corresponding table (Table 7A or 7B), then the ECU may adjust (increase or decrease) the modulation value in order to correspondingly increase or decrease the slippage duration. In other words, the ECU may adjust the amount of current delivered to the modulated valve-solenoid 60 to either increase or decrease the slippage duration.

It is contemplated that the ECU may incrementally adjust the modulation value by, for example, incremental values of +/–0.5%. Therefore, upon detecting a slippage duration shorter than the lower bound slip duration, the ECU may adjust the modulation value by +0.5% to increase the current delivered to the modulated valve-solenoid 60, by +0.5% to thereby correspondingly increase the slippage duration. Of course the opposite is true for a detected duration longer than the upper bound slip duration.

For example, in automatic mode, down-shifting from fourth to third gear, while at 2500 RPM (which is within the 2300–2700 RPM range shown in Table 7B), upon detecting a slip duration shorter than a lower bound slip duration value (refer to Table 7B), which is 232 msec, the ECU may adjust the modulation value (refer to Table 6A), which is 32.0, to 32.5. The higher modulation value increases the current delivered to the modulated valve-solenoid 60 and thereby increases the slippage duration. Subsequently, when at these same conditions again, if the detected slip duration is still lower than the lower bound, the ECU will adjust the modulation value another +0.5% and will repeatedly do so until the detected slip duration is within the bounds defined by Tables 7A or 7B. Alternatively, if the detected slippage duration is longer than the upper bound value contained in the table, the ECU adjusts the modulation value by –0.5% to reduce the slippage duration.

It is contemplated that to reduce the calibration frequency, the ECU may utilize a counter to monitor slip duration values outside the bounds of the tables and, upon realizing a certain number of events, such as a certain number (a calibration number) of duration values above or below the respective bounds, then perform the calibration operation as described above. The counter will monitor and count each incident of exceeding the slip duration bounds as a corresponding + or – value and once the magnitude of the counter value equals the calibration number, the calibration operation is performed. For example, suppose the calibration number is three, if two incidents of the slip duration exceeding the lower bound, then the counter value is –2. If two incidents of the slip duration exceeding the upper bound (corresponding to a value of +2), then the counter value is 0. When the magnitude of the counter value reaches three, the calibration operation will be performed.

It is also contemplated that the calibration operation may only be performed under certain conditions, such as the transmission being in the HI-range and in a down-shifting sequence.

The above description of preferred embodiments should not be interpreted in any limiting manner since variations and refinements are possible that are within the spirit and scope of the present invention. The scope of the invention is defined in the appended claims and their equivalents.

What is claimed is:

1. An automatic transmission assembly, comprising:
    an engine with a crankshaft that rotates at a speed;
    a transmission operatively connected to the crankshaft, the transmission including a main shaft, an output shaft, a plurality of speed gear trains disposed between the main shaft and the output shaft, a gear shifter selectively connected to one of the speed gear trains that causes the selected gear train to engage the output shaft, and a clutch device connected to the main shaft that selectively disengages the main shaft from the crankshaft to permit shifting between the speed gear trains, wherein driving torque is transmitted from the crankshaft to the main shaft and through the selected speed gear train to the output shaft;
    a shifting mode selector that selects between plural modes of shifting operation; and
    a controller in communication with the shifting mode selector, the clutch device, and the gear shifter, so that the controller controls the clutch device to engage and disengage the main shaft from the crankshaft and controls the gear shifter to select one of the plurality of speed gear trains based on a selected shifting mode, wherein the controller includes an input connected to the engine, an output connected to the clutch device and the gear shifter, and a memory in which a plurality of sets of values are stored that control gear change shifting based on sensed operating conditions, wherein each set of values corresponds to a different shifting mode.

2. The assembly of claim 1, wherein the plural modes of shifting operation include a standard shifting mode and plural up-shifting and down-shifting modes.

3. The assembly of claim 2, wherein the standard shifting mode is a default mode.

4. The assembly of claim 1, wherein the plural modes of shifting operation include a default mode, three up-shift modes and three down-shift modes.

5. The assembly of claim 1, wherein the engine includes a throttle, a throttle position sensor coupled to the throttle that senses the degree that the throttle is opened, and a speed sensor coupled to the crankshaft that senses the speed at which the crankshaft is rotating, and wherein input of the controller is connected to the throttle position sensor and the speed sensor.

6. The assembly of claim 1, wherein each set of values includes predetermined throttle position sensor values and predetermined speed values for each gear change shift.

7. The assembly of claim 1, wherein each set of values varies from another set of values based on an engine operating condition to effect shifting at a different engine speed in each shifting mode.

8. The assembly of claim 1, wherein the sets of values are stored as a plurality of look-up tables.

9. The assembly of claim 1 in combination with a vehicle comprising:
   a frame supporting the engine;
   at least two wheels supported for rotation by the frame, wherein the output shaft is operatively connected to at least one of the wheels for rotating the at least one wheel; and
   a seat mounted on the frame for supporting a rider straddle style.

10. The assembly of claim 9, further comprising handle bars mounted to the frame and a shifting lever supported by the handle bars, wherein the shifting lever is coupled to the shifting mode selector.

11. The transmission assembly according to claim 1, wherein the controller is configured to modulate an engagement of the clutch device, to thereby gradually engage the main shaft and crankshaft over a predetermined modulation duration.

12. The transmission assembly according to claim 11, wherein each mode of shifting further defines plural modulation duration values corresponding to the predetermined operating modes of respective modes of shifting, the controller being configured to select an appropriate modulation duration value from the plural modulation duration values based on a comparison of the corresponding predetermined operating values and the sensed operating values.

13. The transmission assembly according to claim 12, wherein the memory additionally stores a set of modulation calibration value ranges, the controller being operable to adjust a current modulation duration value, if the current modulation duration value is determined to be outside a corresponding modulation calibration value range.

14. The transmission assembly according to claim 1, wherein the controller is configured to modulate an engagement of the clutch device, to thereby gradually engage the main shaft and the crankshaft until such time that the engine and transmission are substantially synchronized, the controller being configured to determine the substantial synchronization.

15. The transmission assembly according to claim 1, wherein the controller is configured to modulate an engagement of the clutch device, by gradually engaging the main shaft and crankshaft over a duration defined by one of 1) an amount of time required for the engine and crankshaft to be substantially synchronized and 2) a predetermined modulation duration, whichever occurs first.

16. A method of controlling automatic shifting of a transmission associated with an engine that provides torque, wherein the transmission includes a clutch, a plurality of speed gear trains, and a gear shifter, comprising:
   selecting a shifting mode from a plurality of modes each based on different engine operating conditions;
   sensing engine operating conditions;
   comparing sensed engine operating conditions to stored, predetermined engine conditions in the selected mode to determine when shifting will occur;
   operating the clutch to disengage torque transmission to permit shifting;
   operating the gear shifter to select a speed gear train; and
   operating the clutch to engage torque transmission to the speed gear train.

17. The method of claim 16, wherein the step of sensing engine operating conditions includes sensing the engine speed and a throttle position.

18. The method of claim 16, wherein the step of selecting a shifting mode includes selecting between a default mode and plural up-shift and plural down-shift modes.

19. The method of claim 16, wherein the step of comparing sensed engine conditions to stored, predetermined engine conditions includes comparing engine speed to throttle position to determine whether shifting will occur.

20. A recording medium that stores a control program for controlling a transmission having a clutch and a gear shifter, the recording medium including instructions for causing the transmission to:
   select a shifting mode from a plurality of modes each based on different engine operating conditions;
   sense engine operating conditions;
   compare sensed engine operating conditions to stored, predetermined engine conditions in the selected mode to determine when shifting will occur;
   operate the clutch to disengage torque transmission to permit shifting;
   operate the gear shifter to select a speed gear train; and
   operate the clutch to engage torque transmission to the speed gear train.

21. The recording medium of claim 20, wherein the instructions to sense engine operating conditions include sensing the engine speed and a throttle position.

22. The recording medium of claim 20, wherein the instructions to select a shifting mode include selecting between a default mode and plural up-shift and plural down-shift modes.

23. The recording medium of claim 20, wherein the instructions to compare sensed engine conditions to stored, predetermined engine conditions include instructions to compare engine speed to throttle position to determine whether shifting will occur.

24. A transmission assembly, comprising:
   a clutch device configured to be connected to a crankshaft of an engine;
   a transmission configured to operatively connect to the crankshaft, the transmission including a main shaft, an output shaft, a plurality of speed gear trains disposed between the main shaft and the output shaft, a gear shifter selectively connected to one of the speed gear trains that causes the selected gear train to engage the output shaft, the clutch device connected to the main shaft and configured to be capable of selectively disengaging the main shaft from the crankshaft to permit shifting between the speed gear trains, and a clutch actuator connected to the clutch to actuate clutching action, wherein driving torque is transmittable from the crankshaft to the main shaft and through the selected speed gear train to the output shaft; and
   a controller in communication with the clutch actuator and the gear shifter that controls the clutch actuator to cause the clutch device to engage and disengage the main shaft from the crankshaft and controls the gear shifter to select one of the plurality of speed gear trains, wherein the controller includes an input connectable to the engine, an output connected to the clutch actuator and the gear shifter, and a memory in which a plurality of sets of values are stored that modulate the clutch actuator to control the clutch device based on sensed operating conditions.

25. The assembly of claim 24, wherein the controller includes an additional input provided by a switch element, the switch element being manually manipulable by a user such that the user may select and thereby send one of an up-shift signal and a down-shift signal to the controller, the controller accordingly controlling the clutch actuator and the gear shifter to perform a corresponding one of an up-shift operation and a down-shift operation.

26. The assembly of claim 24, wherein the controller monitors engine operating conditions via the input thereto and compares the monitored engine operating conditions to predetermined, stored engine operating conditions to thereby determine when a shifting operation is appropriate.

27. The assembly of claim 26, wherein the memory stores a plurality of sets of values corresponding to different shifting modes that control gear change shifting based on sensed operating conditions.

28. The assembly of claim 26 in combination with a vehicle comprising:
a frame supporting the engine;
at least two wheels supported for rotation by the frame, wherein the output shaft is operatively connected to at least one of the wheels for rotating the at least one wheel; and
a seat mounted on the frame for supporting a rider straddle style.

29. The assembly of claim 24, wherein each set of values corresponds to predetermined engine operating conditions and provides a duration of modulation of the clutch actuator that progressively deactuates the clutching action.

30. The assembly of claim 24, wherein the engine includes a throttle, a throttle position sensor coupled to the throttle that senses the degree that the throttle is opened, and a speed sensor coupled to the crankshaft that senses the speed at which the crankshaft is rotating, and wherein input of the controller is connected to the throttle position sensor and the speed sensor.

31. The assembly of claim 30, wherein the controller controls the clutch actuator based on the sets of values so that as the degree of throttle opening increases, a duration of modulation decreases.

32. The assembly of claim 30, wherein the controller further comprises a filter that interpolates throttle position values for use during shifting and prevents instantaneous throttle position values from causing unnecessary shifting.

33. The transmission assembly according to claim 24, wherein the clutch actuator includes a solenoid device communicated with the controller and is capable of actuating and deactuating the clutch device based on signals generated by the controller.

34. The transmission assembly according to claim 24, wherein the gear shifter includes a solenoid device communicated with the controller and operable to perform shifting of the gear trains based on shifting signals generated by the controller.

35. The transmission assembly according to claim 24, further comprising a fluid power generation unit, the clutch actuator including a piston device connected to the fluid power generation unit and being displaceable to disengage the main shaft and crankshaft by fluid delivered to the piston device by the fluid power generation unit, the piston device including a drain portion through which fluid exits the piston device to thereby engage the main shaft and crankshaft.

36. The transmission assembly according to claim 35, further comprising a modulated valve solenoid communicated with the drain portion of the piston device, the modulated valve solenoid being connected to the controller so as to be capable of varying fluid flow from the drain portion exiting the piston device to correspondingly vary the engagement of the main shaft and crankshaft.

37. A method of modulating shifting in a transmission including a clutch and a clutch actuator, comprising:
sensing engine operating conditions;
comparing sensed engine operating conditions to stored, predetermined engine conditions to determine a modulation value for the clutch actuator;
disengaging the clutch to cease transmission of torque between the engine and a speed gear train of the transmission to permit shifting;
operating the gear shifter to select another speed gear train; and
progressively reengaging the clutch to correspondingly increase the transmission of torque between the engine and the another speed gear train, wherein the progressive reengagement is based on the modulation value.

38. The method of claim 37, further comprising providing a modulation value to the clutch actuator based on the comparison of the sensed and stored engine operating conditions to control the duration during which the reengagement occurs after the selection of the another speed gear train.

39. The method of claim 37, wherein sensing engine operating conditions includes sensing throttle position values representative of a degree that a throttle of an engine is opened, and sensing a speed at which a crankshaft of an engine is rotating.

40. The method of claim 39, wherein progressively reengaging the clutch to increase the transmission of torque includes decreasing a duration of reengagement as the degree of throttle opening increases.

41. The method of claim 37, further comprising filtering throttle position values for use during shifting to prevent instantaneous throttle position values from causing unnecessary shifting.

42. The method of claim 41, further comprising selecting different modes of shifting from a plurality of sets of values corresponding to different shifting modes to control gear change shifting based on sensed operating conditions.

43. A transmission assembly, comprising:
an engine with a crankshaft that rotates at a speed;
a transmission operatively connected to the crankshaft, the transmission including a main shaft, an output shaft, a plurality of speed gear trains disposed between the main shaft and the output shaft, a gear shifter selectively connected to one of the speed gear trains that causes the selected gear train to engage the output shaft, and a clutch device connected to the main shaft that selectively disengages the main shaft from the crankshaft to permit shifting between the speed gear trains, wherein driving torque is transmitted from the crankshaft to the main shaft and through the selected speed gear train to the output shaft; and
a controller including an input connected to the engine and an output connected to the clutch device and the gear shifter, wherein the controller receives input signals including sensed engine speed, sensed vehicle speed and upshift or downshift signals and generates an output signal that is modulated based on the input signals to control the clutch device to engage and disengage the main shaft from the crankshaft and control the gear shifter to select one of the plurality of speed gear trains.

44. The transmission of claim 43, further including a valve solenoid coupled to the clutch device, wherein the generated output signal controls voltage input to the valve solenoid.

45. The transmission of claim 43, wherein the input signals received by the controller further include sensed throttle position.

46. The transmission of claim 45, further including a valve solenoid coupled to the clutch device, wherein the generated output signal controls voltage input to the valve solenoid.

47. The transmission of claim 43, further comprising a memory of predetermined values, wherein the controller compares the sensed input signals to the predetermined values to generate the output signal.

48. The transmission of claim 43, wherein the transmission is an automatic transmission.

49. The transmission of claim 43, wherein the transmission is a semi-automatic transmission.

\* \* \* \* \*